(12) United States Patent
Grayson et al.

(10) Patent No.: US 11,856,504 B2
(45) Date of Patent: Dec. 26, 2023

(54) WIRELESS AUTHORIZATION AND ACCESS NETWORK-NEUTRAL ADVICE OF CHARGE TECHNIQUES

(71) Applicant: Cisco Technology, Inc., San Jose, CA (US)

(72) Inventors: Mark Grayson, Maidenhead (GB); Jerome Henry, Pittsboro, NC (US); Bart A. Brinckman, Nevele (BE); Matthew Stephen MacPherson, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/720,484

(22) Filed: Apr. 14, 2022

(65) Prior Publication Data
US 2022/0248302 A1    Aug. 4, 2022

Related U.S. Application Data

(63) Continuation of application No. 17/022,744, filed on Sep. 16, 2020, now Pat. No. 11,438,824.
(Continued)

(51) Int. Cl.
*H04W 48/02*    (2009.01)
*H04M 15/00*    (2006.01)
(Continued)

(52) U.S. Cl.
CPC ........... *H04W 48/02* (2013.01); *H04M 15/49* (2013.01); *H04M 15/60* (2013.01); *H04M 15/66* (2013.01);
(Continued)

(58) Field of Classification Search
CPC ......... H04W 48/02; H04W 8/12; H04W 8/18; H04W 12/06; H04W 24/10; H04W 12/08;
(Continued)

(56) References Cited

U.S. PATENT DOCUMENTS 7,945,241 B2    5/2011 Cai et al.
8,175,575 B2 *  5/2012 Cai .......................... H04W 4/24
                                                 455/406
(Continued)

FOREIGN PATENT DOCUMENTS

CN    100525499 C    8/2009
EP      1173997 B1    6/2005
(Continued)

OTHER PUBLICATIONS

IEEE, "IEEE Standard for Information Technology—Local and Metropolitan Area Networks—Specific Requirements Part 11: Wireless LAN MAC and PHY Specifications", IEEE Std 802. Nov. 2016, Dec. 14, 2016, 2 pages.
(Continued)

*Primary Examiner* — Brandon J Miller
(74) *Attorney, Agent, or Firm* — Edell, Shapiro & Finnan, LLC

(57) ABSTRACT

Presented herein are techniques to facilitate wireless authorization based on in-line assurance and tariffing information. In one example, a method may include obtaining, by a home network, a request to authorize access of a roaming subscriber for a visited network; determining whether the request includes visited network charging information and visited network metric information; based on determining that the request includes the visited network charging information and the visited network metric information, determining whether one or more visited network metrics satisfy one or more threshold metrics for the roaming subscriber;
(Continued)

and based on determining that the one or more visited network metrics satisfy the one or more threshold metrics for the roaming subscriber, authorizing access of the roaming subscriber for the visited network.

20 Claims, 22 Drawing Sheets

Related U.S. Application Data

(60) Provisional application No. 63/030,956, filed on May 28, 2020, provisional application No. 62/982,270, filed on Feb. 27, 2020.

(51) Int. Cl.
| | |
|---|---|
| *H04W 24/10* | (2009.01) |
| *H04W 8/18* | (2009.01) |
| *H04W 12/06* | (2021.01) |
| *H04W 4/24* | (2018.01) |
| *H04W 12/082* | (2021.01) |
| *H04W 8/12* | (2009.01) |

(52) U.S. Cl.
CPC ......... *H04M 15/8038* (2013.01); *H04W 4/24* (2013.01); *H04W 8/12* (2013.01); *H04W 8/18* (2013.01); *H04W 12/06* (2013.01); *H04W 12/082* (2021.01); *H04W 24/10* (2013.01)

(58) Field of Classification Search
CPC ..... H04W 12/60; H04M 15/49; H04M 15/60; H04M 15/66; H04M 15/8038; H04M 15/83; H04M 15/85; H04M 15/852; H04Q 12/082; H04L 63/0892; H04L 12/14; H04L 12/1414
See application file for complete search history.

(56) References Cited

U.S. PATENT DOCUMENTS

| | | | |
|---|---|---|---|
| 9,020,467 B2 | 4/2015 | Zhang et al. | |
| 9,031,557 B2 | 5/2015 | Schwalb | |
| 9,031,577 B2 | 5/2015 | Schwalb | |
| 9,699,644 B2 | 7/2017 | Noldus et al. | |
| 9,716,999 B2 | 7/2017 | Zhang et al. | |
| 10,348,910 B2 | 7/2019 | Gaur | |
| 10,749,869 B1 | 8/2020 | Bryan et al. | |
| 11,438,824 B2 * | 9/2022 | Grayson | H04M 15/83 |
| 2002/0133457 A1 * | 9/2002 | Gerlach | H04M 15/765 705/40 |
| 2004/0193712 A1 * | 9/2004 | Benenati | H04W 12/0431 709/225 |
| 2006/0218302 A1 | 9/2006 | Chia et al. | |
| 2009/0215447 A1 | 8/2009 | Catalano et al. | |
| 2012/0149334 A1 | 6/2012 | Zhang et al. | |
| 2013/0017803 A1 * | 1/2013 | Li | H04M 15/8038 455/406 |
| 2013/0095825 A1 | 4/2013 | Mann et al. | |
| 2014/0023059 A1 | 1/2014 | Gupta | |
| 2015/0223042 A1 | 8/2015 | Li | |
| 2015/0327207 A1 | 11/2015 | Bharadwaj | |
| 2016/0066175 A1 | 3/2016 | Wang et al. | |
| 2016/0182402 A1 * | 6/2016 | Carames | H04L 47/808 709/225 |
| 2017/0127338 A1 | 5/2017 | Canpolat et al. | |
| 2018/0132289 A1 | 5/2018 | Zhao et al. | |
| 2018/0324886 A1 | 11/2018 | Jung et al. | |
| 2018/0332176 A1 | 11/2018 | Lee | |
| 2018/0338278 A1 * | 11/2018 | Ketonen | H04W 48/18 |
| 2019/0037071 A1 | 1/2019 | Singh et al. | |
| 2019/0281507 A1 | 9/2019 | Rahat et al. | |
| 2019/0327317 A1 | 10/2019 | Lu et al. | |
| 2020/0015140 A1 * | 1/2020 | Nam | H04W 36/30 |
| 2021/0014224 A1 | 1/2021 | Gordon et al. | |
| 2021/0037013 A1 | 2/2021 | Salkintzis | |
| 2021/0084174 A1 | 3/2021 | Xu et al. | |
| 2021/0099867 A1 | 4/2021 | Brown et al. | |
| 2021/0105632 A1 | 4/2021 | Pazhyannur et al. | |
| 2021/0120424 A1 | 4/2021 | Kang et al. | |
| 2021/0211975 A1 | 7/2021 | Prabhakar et al. | |
| 2021/0274048 A1 | 9/2021 | Grayson et al. | |
| 2021/0360719 A1 | 11/2021 | Kwan et al. | |
| 2022/0086620 A1 | 3/2022 | Nakarami et al. | |
| 2022/0264300 A1 | 8/2022 | Nix | |

FOREIGN PATENT DOCUMENTS

| | | | | |
|---|---|---|---|---|
| WO | WO-9624226 A1 * | 8/1996 | | H04M 15/28 |
| WO | 2011149532 A1 | 12/2011 | | |

OTHER PUBLICATIONS

O. Friel et al., "BRSKI over IEEE 802.11 draft-friel-anima-brski-over-802dot11-00", Network Working Group, Oct. 18, 2018, 18 pages.
3GPP, "3rd Generation Partnership Project; Technical Specification Group Core Network and Terminals; Advice of Charge (AoC) supplementary services; Stage 3 (Release 16)", 3GPP TS 24.086 V16.0.0 (Jul. 2020), 11 pages.
GSM Association, "Recommendations for Minimal Wi-Fi Capabilities of Terminals", Version 1.1, Dec. 18, 2012, 38 pages.
A. DeKok et al., "Data Types in RADIUS", Internet Engineering Task Force (IETF), Jan. 2017, 35 pages.
H. Hakala et al., "Diameter Credit-Control Application", Network Working Group, Aug. 2005, 114 pages.
GSM Association, "IMS Profile for Voice, Video and SMS over untrusted Wi-Fi access", IR.51, Version 8.0, Apr. 29, 2020, 21 pages.
GSM Association, "Definition of Quality of Service parameters and their computation", Version 8.0, Aug. 29, 2017, 76 pages.
Ruckus, "How Interworking Works: A Detailed Look at 802.11u and Hotspot 2.0 Mechanisms", Ruckis White Paper, Jul. 2013, 12 pages.
Wi-Fi Alliance, "Hotspot 2.0 Technical Specification", Version 1.2.11, Apr. 3, 2018, 225 pages.
Wi-Fi Alliance, "Hotspot 2.0 Specification", Version 3.1, Apr. 24, 2019, 203 pages.
"802.11ax-2021—IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications Amendment 1: Enhancements for High-Efficiency WLAN," Abstract, IEEE, https://ieeexplore.ieee.org/document/9442429, May 19, 2021, 2 pages.
Ralph Kuhne et al., "Charging and Billing in Modern Communications Networks A Comprehensive Survey of the State of the Art and Future Requirements", IEEE Communications Surveys and Tutorials, Institute of Electrical and Electronics Engineers, vol. 14, No. 1, Jan. 1, 2012, 23 pages.
3GPP2, "cdma2000 Wireless IP Network Standard: Accounting Services and 3GPP2 Radius VSAs", X.S0011-005-Cv1.0, Aug. 2003, 48 pages.
International Search Report and Written Opinion in counterpart International Application No. PCT/US2021/018713, dated May 10, 2021, 17 pages.
"JSON Schema Draft-07 Release Notes," JSON Schema, https://json-schema.org/draft-07/json-schema-release-notes.html, retrieved Sep. 8, 2021, 4 pages.
"JSON Schema Draft-07," JSON Schema, json-schema.org/draft-07/schema, retrieved Sep. 8, 2021, 4 pages.
"Integration of Cellular and Wi-Fi Networks," 4G Americas, Sep. 2013, 65 pages.
Toni Adame, et al., "The TMB path loss model for 5 GHz indoor WiFi scenarios: On the empirical relationship between RSSI, MCS, and spatial streams," Cisco, IEEE Xplore, 2019, retrieved Sep. 8, 2021, 8 pages.

(56) References Cited

OTHER PUBLICATIONS

B.T. Vijay, et al., "Quality of Service Improvements in IEEE 802.11AX Wi-Fi," Ictact Journal on Communication Technology, vol. 9, Issue 3, Sep. 2018, 8 pages.
Der-Jiunn Deng, et al., "On Quality-of-Service Provisioning in IEEE 802.11ax WLANs," IEEE Access, Special Section on Green Communications and Networking for 5G Wireless, vol. 4, 10.1109/ACCESS.2016.260228, Oct. 15, 2016, 19 pages.
C. Rigney, et al., "Remote Authentication Dial In User Service (RADIUS)," Network Working Group, Request for Comments: 2865, Obsoletes: 2138, Category: Standards Track, Jun. 2000, 76 pages.
"Roaming Service Level Agreement Guidelines," BA.51, GSM Association, Version 4.2, Apr. 15, 2019, 33 pages.
"Part 11: Wireless LAN Medium Access Control (MAC) and Physical Layer (PHY) Specifications," IEEE Standards Association, IEEE Std 802.11u™-2011, Feb. 25, 2011, 208 pages.
"802.11v-2011—IEEE Standard for Information technology—Local and metropolitan area networks—Specific requirements—Part 11: Wireless LAN Medium Access Control (MAC) and Physical Layer (PHY) specifications Amendment 8: IEEE 802.11 Wireless Network Management," Abstract, IEEE, https://ieeexplore.ieee.org/document/5716530?signout=success, Feb. 9, 2011, 2 pages.
"Wireless IP Network Standard: Accounting Services and 3GPP2 RADIUS VSAs," 3rd Generation Partnership Project 2, 3GPP2, X.P0011.5, Version: 1.0, May 2003, 47 pages.

\* cited by examiner

```
{
  "$schema": "http://json-schema.org/draft-07/schema#",
  "$id": "http://openroaming.org/or-md-aoc.json",
  "title": "OpenRoaming Multi-Domain Advice of Charge",
  "description": "Version 0.1 of OpenRoaming's Multi-Domain Advice of Charge Schema",
  "type": "object",
  "properties": {
    "type": {
      "type": "string", "pattern": "AdviceofChargePolicy", "description":
      "The type encodes the advice of charge policy"
    },
    "majorReleaseLevel": {
      "type": "integer", "minimum":0, "maximum": 99,
      "description": "Specification Version Number identifies the used format"
    },
    "minorReleaseLevel": {
      "type": "integer", "minimum":0, "maximum": 99,
      "description": "Specification Version Number identifies the used format"
    },
    "provisioningDomain": {
      "type": "string", "description": "the provisioning domain to which the charging information applies"
    },
    "chargingType": {
      "type": "string", "pattern": "(metered) | (unmetered)"
```

```
},
"chargeableEntity": {
    "type": "string", "pattern": "(user) | (sponsor)",
    "description": "if the charging type is metered, the entity being charged for access"
},
"chargeableUnit": {
    "type": "string", "pattern": "(time) | (volume) | (session)",
    "description": "if the charging type is metered, the unit of charge being employed"
},
"additionlUnmeteredServiceIdentities": {
    "type": "array", "items": {
        "applicationName": {
            "type": "string", "description": "A unique name that identifies the application flows"
        }
    }
},
"required": [ "type", "majorReleaseLevel", "minorReleaseLevel",
    "provisioningDomain", "chargingType" ]
}
```

606 — chargeableEntity
608 — chargeableUnit
610 — additionlUnmeteredServiceIdentities

FIG. 6B

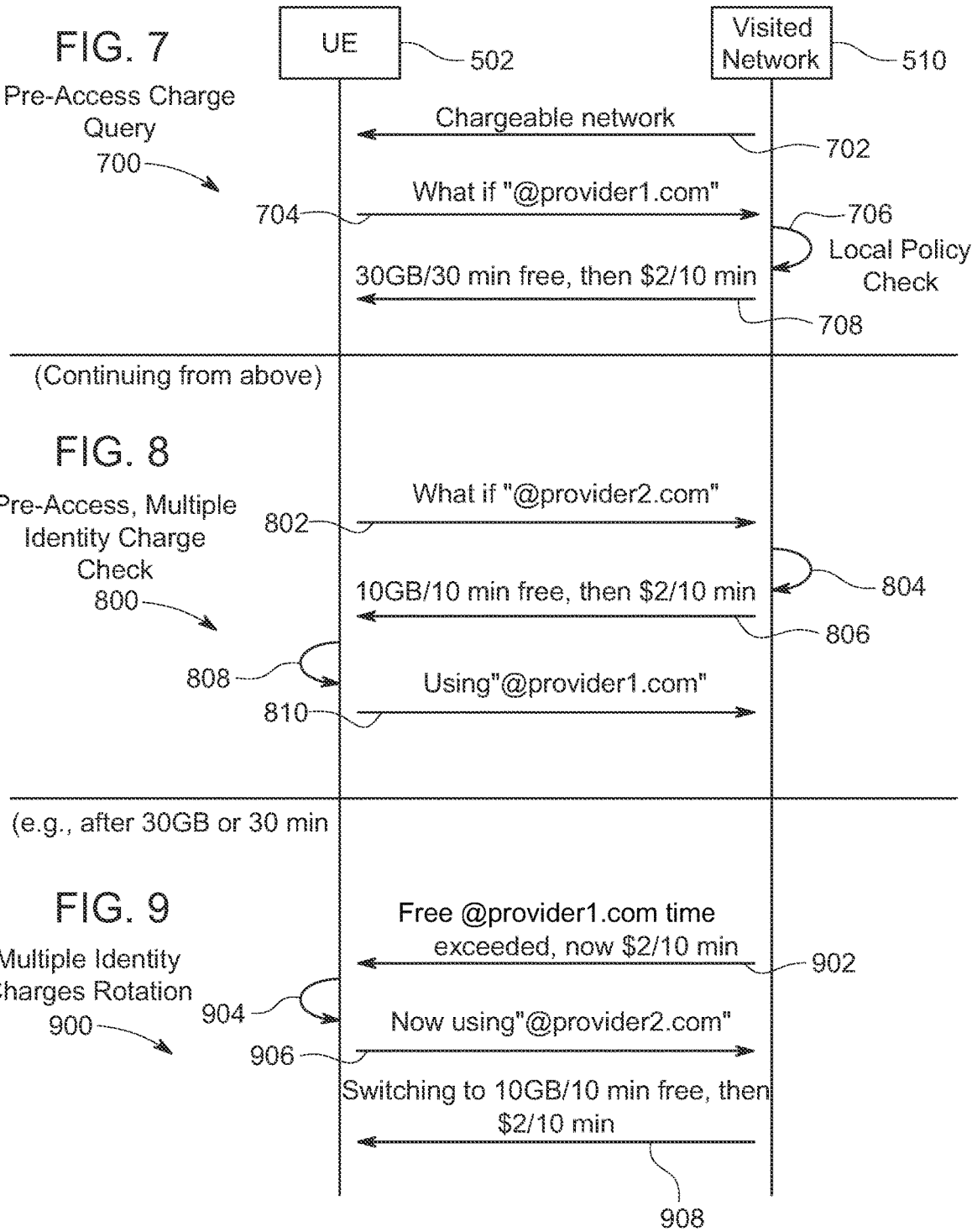

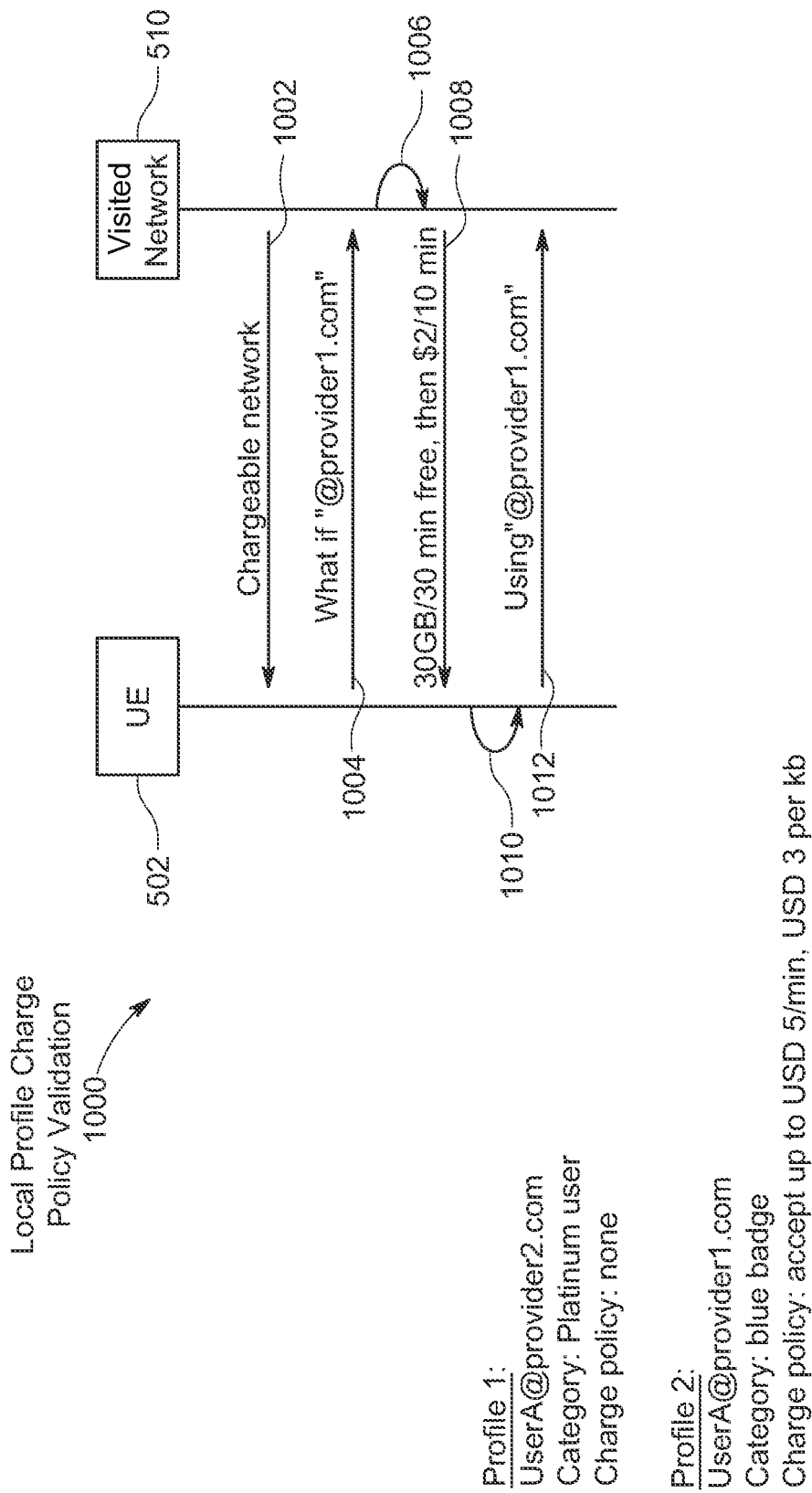

WIRELESS AUTHORIZATION AND ACCESS NETWORK-NEUTRAL ADVICE OF CHARGE TECHNIQUES

PRIORITY CLAIMS

This application is a continuation of and claims the benefit of priority to U.S. patent application Ser. No. 17/022,744, filed Sep. 16, 2020, which application claims the benefit of priority under 35 U.S.C. § 119 to U.S. Provisional Application No. 63/030,956, filed May 28, 2020, and also claims the benefit of priority under 35 U.S.C. § 119 to U.S. Provisional Application No. 62/982,270, filed Feb. 27, 2020, the entirety of which applications are incorporated herein by reference.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical. In particular, there are significant challenges in managing user equipment authorizations in various wireless networking architectures.

BRIEF DESCRIPTION OF THE DRAWINGS

FIGS. 6A and 6B are a schematic diagram illustrating an example data schema that may be utilized for AoC techniques discussed herein herein, according to various example embodiments.

FIGS. 7, 8, 9, 10, 11, 12, 13, 14, and 15 are example message sequence diagrams illustrating example call flows for various operations that may be performed utilizing AoC techniques provided herein, according to various example embodiments.

DESCRIPTION OF EXAMPLE EMBODIMENTS

Overview

Figure 1:
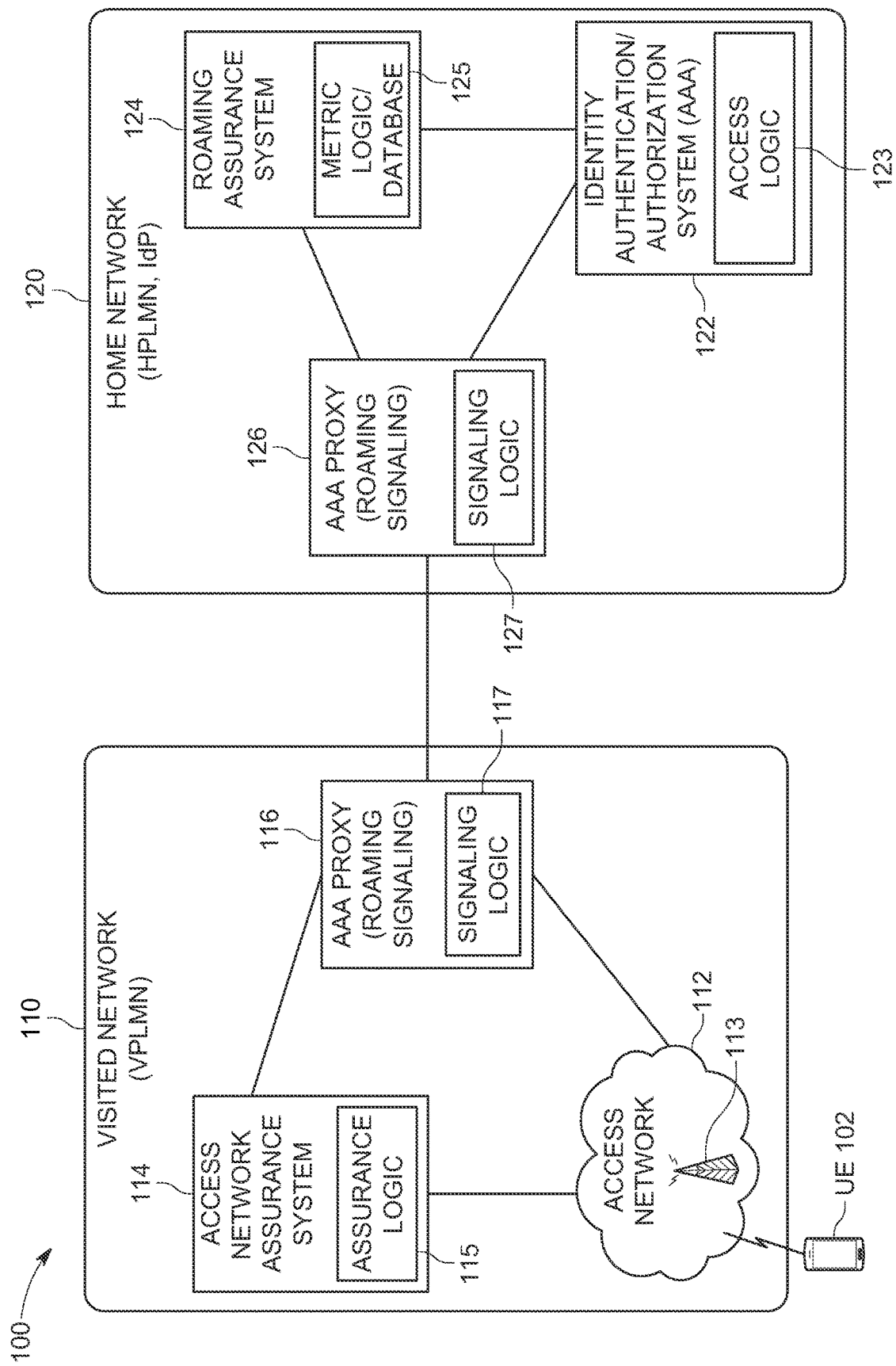
FIG. 1 is a diagram of a system in which techniques that facilitate wireless authorization for a user equipment based on in-line assurance and tariffing information may be implemented, according to an example embodiment.

Techniques presented herein may enable identity providers participating in an OpenRoaming™ system to approve or deny authorization of a user equipment to attach to a particular access network based, at least in part, on levels or thresholds associated with assurance and/or tariffing information. In some instances, specific levels or thresholds for assurances may vary depending on inter-operator tariffs.

In one embodiment, a system and method are provided which uses a combination of service assurance and tariff information in access control decisions for one or more user equipment (UE). For example, in one embodiment a method is performed, which may include obtaining, by a home network, a request to authorize access of a roaming subscriber for a visited network; determining whether the request includes visited network charging information and visited network metric information; based on determining that the request includes the visited network charging information and the visited network metric information, determining whether one or more visited network metrics satisfy one or more threshold metrics for the roaming subscriber; and based on determining that the one or more visited network metrics satisfy the one or more threshold metrics for the roaming subscriber, authorizing access of the roaming subscriber for the visited network.

In some instances, the service assurance information and/or the tariff information may be appended to Authentication, Authorization, and Accounting (AAA) signaling. In some instances, the service assurance information may include Internet Protocol-Service Level Agreement (IP-SLA) information and/or Radio Frequency-Service Level Agreement information (RF-SLA). In some instances, an authenticating entity may utilize a set of assurance thresholds to determine whether to authorize access for the one or more UE. In some instances, the authenticating entity may adapt the set of thresholds according to the presence and contents of the tariff information.

Further provided herein are techniques that involve a JavaScript Object Notation (JSON) and Application Programming Interface (API) that enables devices to recover advice of charge (AoC) information in an access technology neutral manner. For example, in one embodiment, a method is performed, which may include determining, by a roaming subscriber, that a visited network is a chargeable network; querying, by the roaming subscriber, the visited network for charging policies for at least two identity realms; obtaining, by the roaming subscriber, charging policy metadata associated with the charging policies for the at least two identity realms; selecting, by the roaming subscriber, an identity realm through which to connect to the visited network based on the charging policy metadata for the at least two identity realms; and connecting to the visited network using the selected identity realm.

Example Embodiments

The OpenRoaming™ (OR) network architecture is a system built on an assumption of best effort, settlement free access. Under an OpenRoaming network architecture, it may be advantageous to incentivize the deployment of high-quality, well-engineered wireless networks. Further, it may be advantageous to define an approach for loosely coupling assurance signaling, which may not be specific to a particular access network.

Conventional roaming systems are typically based on an offline exchange of inter-operator tariffs/costs. Further, some conventional roaming systems have been augmented with Quality of Service (QoS) information. Global System for Mobile Communications Association (GSMA) BA.51 defines roaming service level agreement guidelines which includes exchanged information such as QoS Parameter/Key Performance Indicator (KPI) Name, Global Roaming Quality (GRQ) Number Packet Data Protocol (PDP) context activation success ratio (PDP_CA_SR) (%), PDP context activation time (second), File Transfer Protocol (FTP) download Goodput (in kilobits per second (kbps)), ping roundtrip time (in milliseconds (ms)). In conventional deployments, active probes may be used to derive such parameters.

A key missing element in the case of OpenRoaming is a technique to include QoS information into the OpenRoaming dialog. Such a dialog involving QoS information may enable a Wi-Fi® infrastructure (and possibly a client) to exchange information related to access parameter(s) or condition(s) (e.g., current and/or minimum QoS, traffic, etc.) and may enable the client to exchange information with its Identity Provider (IDP or IdP) related to these local conditions, thereby allowing the IDP to assess whether offload of the client to the Wi-Fi leg (access network) from a cellular access network is desirable or not.

Techniques presented herein may enable identity providers to fail or deny authorization of a user equipment to attach to a particular access network if levels or thresholds associated with assurance and/or tariffing are not met. Specific levels or thresholds for assurances may vary depending on actual inter-operator tariffs.

Referring to FIG. 1, FIG. 1 is a block diagram of a system 100 in which techniques that facilitate wireless authorization for a user equipment based on in-line assurance and tariffing information may be implemented, according to an example embodiment. System 100 may include a visited network 110 and a home network 120. At least one user equipment (UE) 102 is also shown in system 100.

Visited network 110 may include an access network 112, an access network assurance system 114 (which may also referred to herein as a network data platform), and one or more roaming signaling nodes, which may be inclusive of at least one Authentication, Authorization, and Accounting (AAA) proxy node 116 (which may also referred to herein as AAA proxy enrichment node). Access network 112 may include one or more radio nodes 113. Access network assurance system 114 may include assurance logic 115 and AAA proxy 116 may include signaling logic 117. Each element/node/system of visited network 110 may be capable of interfacing with each other for performing various operations discussed herein.

Home network 120 may include an identity authentication and authorization (authentication/authorization) system 122, a roaming assurance system 124, and one or more roaming signaling nodes, which may be inclusive of at least one AAA proxy node 126. Identity authentication/authorization system 122 may include access logic 123. In some instances identity authentication/authorization system 122 may be considered an AAA system or service. Roaming assurance system 124 may include metric logic and a database (logic/database) 125. AAA proxy may include signaling logic 127. Each element/node/system of home network 130 may be capable of interfacing with each other for performing various operations discussed herein. Additionally, visited network 110 and home network 120 may interface via corresponding AAA proxies 116/126 for performing various operations discussed herein.

In one instance, visited network 110 may be considered a visited public land mobile network (VPLMN) 110 and home network 120 may be considered a home PLMN (HPLMN) 120. Home network 120 may be associated with a service provider (SP) with which a user associated with UE 102 may have a subscription for services, including roaming services, etc. In some instances, the home network 120 may be considered an Identity Provider (IdP or IDP), which may be analogous to SP, such that the IdP may provide access decisions (accept, reject, limited access, etc.), identity information, and/or the like for one or more devices, such as UE 102, attempting to connect to one or more access networks (e.g., access network 112) of one or more visited networks (e.g., visited network 110).

Access network 112 may be inclusive of one or more Radio Access Networks (RANs) for one or more Radio Access Technology (RAT) types that may be provided via any combination of with radio nodes 113 [sometimes referred to as access points (APs)], which may include any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate access network connections for one or more elements of system 100.

In various embodiments, access network 112 via one or more radio node 113 may provide RAN coverage for any combination of licensed spectrum wireless wide area (WWA) access networks, such as Third (3rd) Generation Partnership Project (3GPP) access networks (e.g., 4th Generation (4G)/Long Term Evolution (LTE), 5th Generation (5G), next Generation (nG), etc. access networks), unlicensed spectrum non-3GPP wireless local area (WLA) access networks (e.g., Institute of Electrical and Electronic Engineers (IEEE) 802.11 (Wi-Fi®), IEEE 802.16 (WiMAX®), Wireless Local Area (WLA) Network (WLAN), etc. access networks), unlicensed spectrum 3GPP access networks (e.g., License Assisted Access (LAA), enhanced LAA (eLAA), 5G New Radio in Unlicensed (5GNRU) etc. access networks), and/or the like. Thus, radios/access points 113 for access network 112 may include any combination of 4G/LTE evolved Node Bs (eNBs or eNodeBs), 5G/next generation NodeBs (gNBs), Wi-Fi® APs, and/or any other radio devices now known here or hereafter developed that may facilitate over-the-air Radio Frequency (RF) connections with one or more devices, such as UE 102. For embodiments herein, access network 112 may further be representative of an OpenRoaming access network.

In various embodiments, a UE, such as UE 102, may be associated with any user, subscriber, employee, client, customer, electronic device, etc. wishing to initiate a flow in system 100 and may be inclusive of any device that initiates a communication in system 100, such as a computer, an electronic device such as an industrial device, automation device, enterprise device, appliance, Internet of Things (IoT) device, etc., a laptop or electronic notebook, a cellular/Wi-Fi® enabled telephone/smart phone, tablet, etc. and/or any other device, component, element, or object (e.g., a dual connection enabled device) capable of initiating voice, audio, video, media, or data exchanges within system 100. It is to be understood that UE 102 may also be configured with any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate over the air RF connections with one or more access networks.

In some instances, access network 112/radio nodes 113 and access network assurance system 114 may represent an AP infrastructure. During operation in accordance with embodiments herein, the AP infrastructure (e.g., any combination of access network 112/radio nodes 113 and/or access network assurance system 114) may express any combination Service Level Agreement (SLA) assurance information and/or tariffing information to home network 120, in particular, identity authentication/authorization system 122, which may enable the identity authentication/authorization system 122 to determine whether to permit or deny a roaming subscriber of home network 120, such as UE 102, from connecting to and/or maintaining a connection to access network 112 of visited network 110.

Generally, authentication refers to a process in which an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, such as whether a roaming subscriber, such as UE 102, may be allowed to connect to and/or maintain a connection to access network 112 of visited network 110. As discussed for embodiments herein, authorization for a roaming subscriber to connect/maintain a connection to a visited access network may be enhanced to consider SLA assurance and/or tariffing information that may be obtained by home network 120 from visited network 110 in order to determine whether a roaming subscriber, such as UE 102, may connect to/maintain a connection to access network 112 of visited network 110.

In various embodiments, SLA information can include RF related SLA (RF-SLA) assurance information and Internet Protocol (IP) and/or network performance related SLA (IP-SLA) assurance information. In some embodiments, such assurance information (e.g., values, metrics, etc.) may be advertised as Roaming Consortium Organizational Identifier (RCOI) indices and/or may be expressed through hybrid modes (e.g., IEEE 802.11ax Expected Service Parameter (ESP) per Access Category (AC)/User Priority (UP) [in 802.11, there are 8, 0 to 7 forming the 8 possible user priorities grouped into categories (AV_VO, voice, AC_VI video, AC_BE, best effort, and AC_BK, background), ESP can be provided for each individual UP, or for each AC (which reduces the field size from 8 to 4)], IEEE 802.11v IP-SLA (IP uplink performance metrics), and/or IEEE 802.11u tariff extensions). In some embodiments, the expressed information may be temporal in that it may be updated at intervals as RF and/or IP conditions may change and/or may be predicted to change, which can be predicted based on any learning mechanism (e.g., machine learning).

In at least one embodiment, new AAA attributes may be defined to carry in-line information pertaining to tariffing information, IP-SLA assurance information, and/or RF-SLA assurance information. As a roaming subscriber or client of home network 120, such as UE 102, attempts to attach to a particular AP, such as radio node 113 of access network 112, an access request message for UE 102 message can be appended by AAA proxy 116 to express any combination of RF-SLA values and/or metrics, IP-SLA values/metrics, and/or tariff information to home network 120 via the access request message.

In one embodiment, as the incoming client scans and discovers the OR network (e.g., access network 112), any combination of RF-SLA, IP-SLA, and/or tariff elements may be retrieved via one or more exchanges between AAA proxy 116 and access network assurance system 114 and may be encoded in AAA attributes of an access request message as the client attempts to join the network. For example, tariffing/cost information, IP-SLA information, and/or RF-SLA information may be expressed as tariffing and/or SLA assurance information or metrics that can be appended by the visited network 110 via AAA proxy 116 to the access request message received from a roaming subscriber, such as UE 102.

In some embodiments, identity authentication/authorization system 122 may use SLA and/or tariffing information obtained via an access request for a roaming subscriber of home network 120, such as UE 102 to determine whether to permit or deny UE 102 from connecting to access network 112. The determination may be performed based on various threshold metrics, which may be amended or updated, as discussed in further detail below, in which threshold metric checks may be performed via any combination of group threshold level checks (e.g., using threshold metrics for all subscribers associated with home network 120) and/or subscriber-specific threshold level checks (e.g., using subscriber specific policies, metrics, etc.).

In still some embodiments, SLA and/or tariffing information can be included in-line in one or more accounting request messages for a roaming subscriber of home network 120, such as UE 102, sent from visited network 110 to home network 120 for ongoing service provided to the UE via access network 112. In such embodiments, identity authentication/authorization system 122 may use SLA and/or tariffing information obtained via the accounting request to determine whether ongoing service is to be maintained for the UE. Such a determination may be performed based on various threshold metrics, which may be amended or updated, as discussed blow, in which threshold metric checks may be performed via any of the threshold levels discussed above (e.g., group and/or subscriber-specific) and/or via on-going service threshold levels, which may be different from the group and subscriber-specific threshold levels.

Figure 2A:
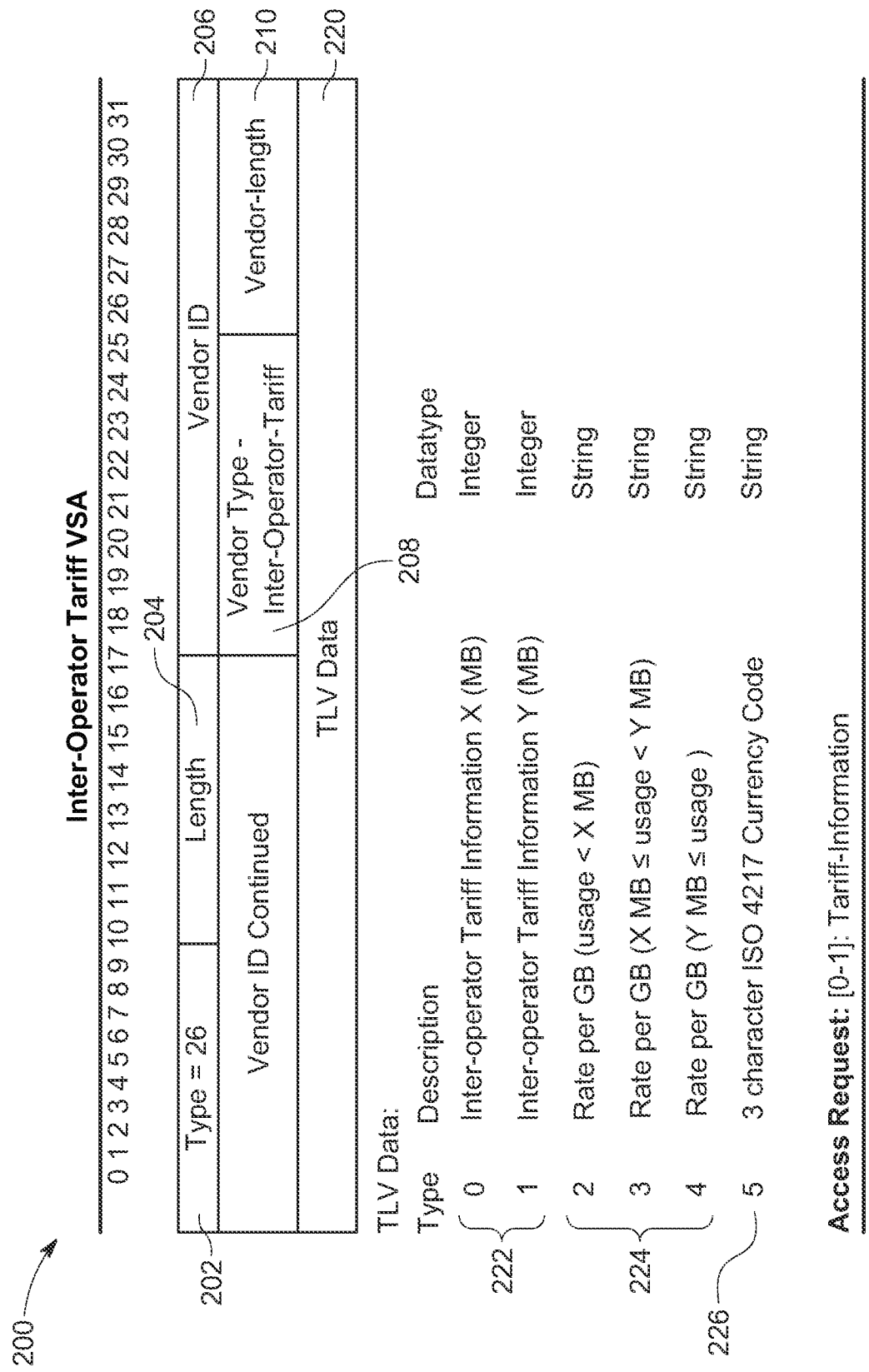
FIGS. 2A, 2B, and 2C are schematic diagrams illustrating example message formats that may be utilized to perform techniques herein, according to various example embodiments.
Figure 2B:
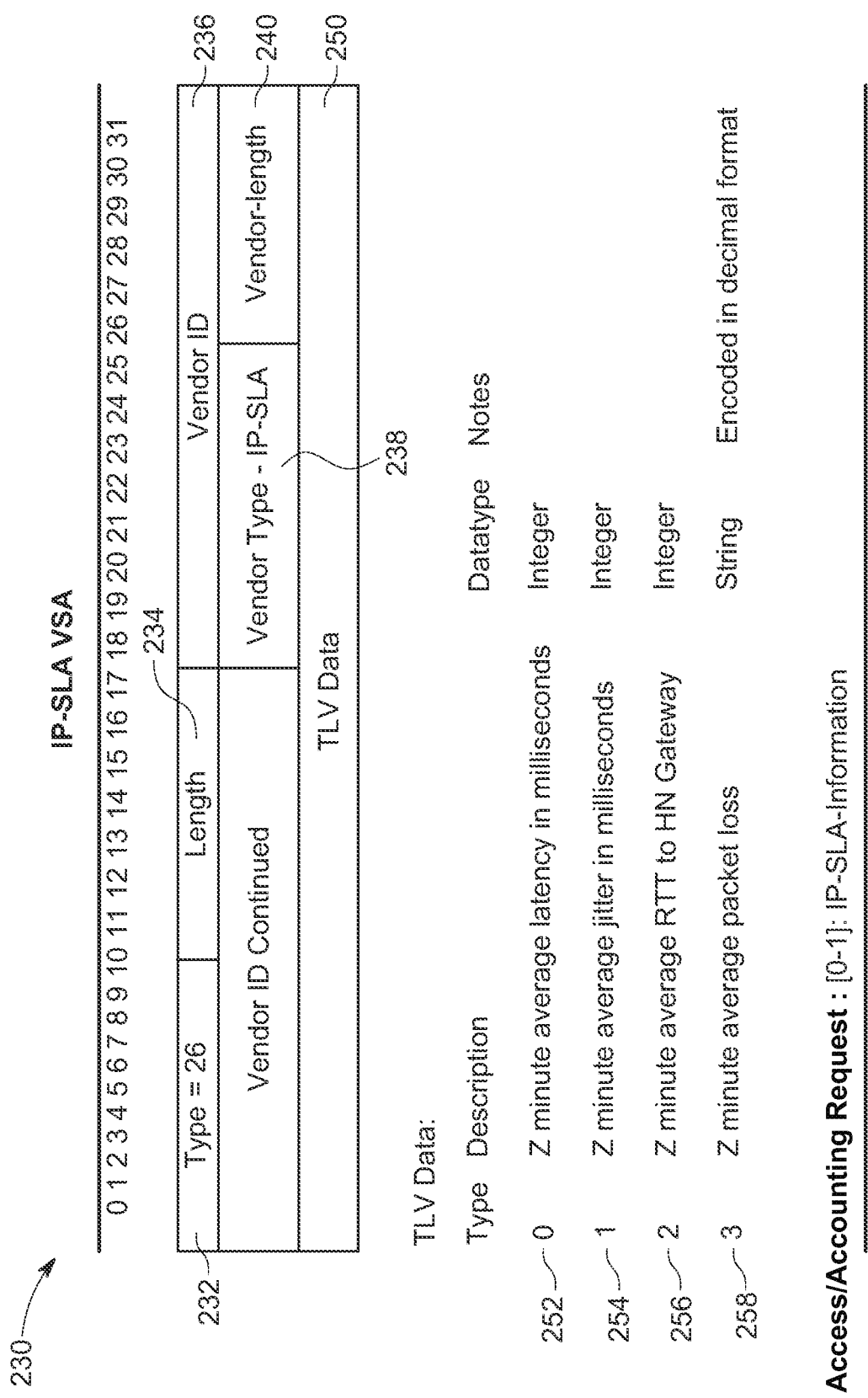
Figure 2C:
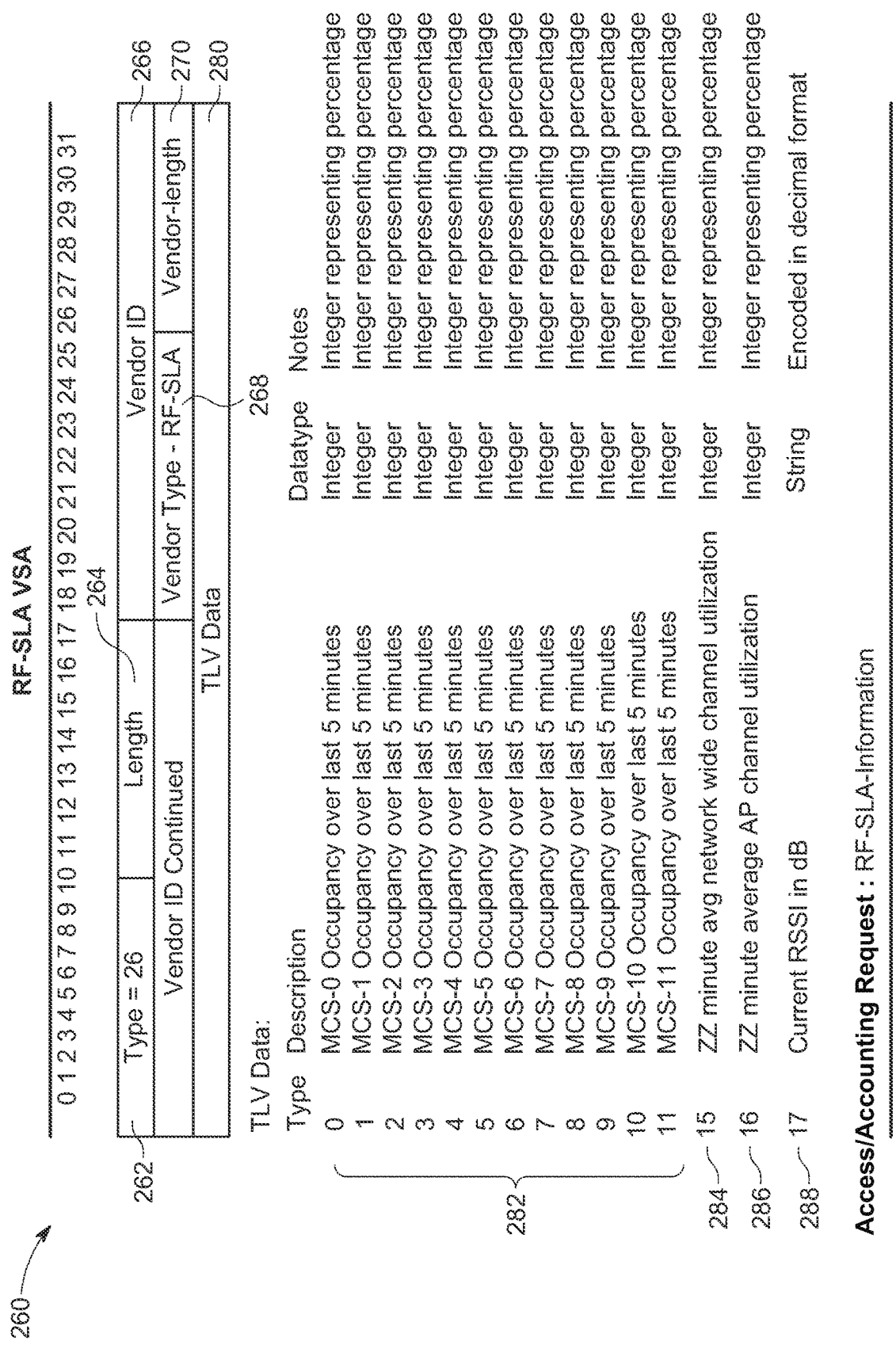

In at least one embodiment, in-line SLA and/or tariffing information may be encoded in Remote Authentication Dial-In User Service (RADIUS) Vendor Specific Attributes (VSAs). Various example RADIUS VSAs are illustrated in FIGS. 2A, 2B, and 2C, which are discussed in connection with FIG. 1. As illustrated in the example VSAs of FIGS. 2A-2C, a bit may be set within a given message to '0' or '1' to indicate whether a given type of information is appended to a given message. In some embodiments, inter-operator tariffing information, IP-SLA information, and/or RF-SLA information may be expressed as tariffing and/or SLA information related to QoS level(s) or other service level(s) expected or contracted by the user of UE 102 (with the home network/IdP 120) and/or one or more applications/application data flow(s) associated with UE 102.

Example tariffing information that may be encoded in a RADIUS VSA is illustrated in FIG. 2A, which is a schematic diagram illustrating example details associated with an inter-operator tariff VSA 200 that can be appended to visited network 110 signaling communicated to home network 120 (e.g., an access request message for UE 102), according to an example embodiment. The inter-operator tariff VSA 200 may be included in an access request message if a visited network operator/access network expects to be remunerated for access provided to a UE associated with a given home network.

In at least one embodiment, inter-operator tariff VSA 200 may include a Type field 202, a Length field 204, a Vendor Identifier (ID) field 206, a Vendor Type field 208, a Vendor-length field 210, and various tariffing/cost relating information encoded in one or more Type-Length-Value (TLV) objects/data 220.

In at least one embodiment, Type field 202 can be set to a value (e.g., 26) indicating a VSA, Length field 204 can be set based on the size of the inter-operator tariff VSA 200, the Vendor ID field 206 can be set to a vendor-specific identifier (e.g., identifier for visited network 110), the Vendor Type field can be set to a value that indicates that the VSA is an inter-operator tariff VSA (e.g., a unique 8-bit value identifying the inter-operator tariff VSA type), and the Vendor-length field 210 may be set based on the size of the TLV data.

In various embodiments, TLV data 220 carried in the inter-operator tariff VSA 200 may include one or more data usage levels or thresholds 222 (e.g., threshold 'Y' expressed in megabytes (MB)/gigabytes (GB)/etc., threshold 'Y', etc.), optional data usage rate information 224 for one or more data usage thresholds (e.g., a first rate for data usage<'X' MB, a second rate for 'X' MB≤data usage<'Y' MB, and a third rate for data usage≥'Y' MB), and a currency code 226, which may be expressed according to the International Organization for Standardization (ISO) 4217 currency codes.

It is to be understood that the tariffing/cost information discussed for inter-operator tariff VSA 200 is provided for illustrative purposes only and is not meant to limit the broad scope of the present disclosure. Virtually any type of tariffing/cost related information may be carried in an inter-operator tariff VSA including, but not limited to, cost per minute/hour/day/month/etc., cost per uplink data/downlink data, cost per data type/service type/data rate/application or application type, and/or any other information that may be related to tariffing/cost information for access network usage in accordance with embodiments described herein.

Example IP-SLA assurance information that may be encoded in a RADIUS VSA is illustrated in FIG. 2B, which is a schematic diagram illustrating example details associated with an IP-SLA VSA 230 that can be appended to visited network 110 signaling communicated to home network 120 (e.g., an access and/or accounting request message for UE 102), according to an example embodiment. The IP-SLA VSA 230 may optionally be included in a given message by the visited network 110/AAA proxy node 116.

In at least one embodiment, IP-SLA VSA 230 may include a Type field 232, a Length field 234, a Vendor Identifier (ID) field 236, a Vendor Type field 238, a Vendor-length field 240, and various IP/network performance related assurance information encoded in one or more TLV objects/data 250.

In at least one embodiment, Type field 232 can be set to a value (e.g., 26) indicating a VSA, Length field 234 can be set based on the size of the IP-SLA VSA 230, the Vendor ID field 236 can be set to a vendor-specific identifier (e.g., identifier for visited network 110), the Vendor Type field can be set to a value that indicates that the VSA is an IP-SLA VSA (e.g., a unique 8-bit value identifying the IP-SLA VSA type), and the Vendor-length field 240 may be set based on the size of the TLV data field 250.

In various embodiments, TLV data 250 carried in the IP-SLA VSA 230 may include latency information 252 (e.g., expressed in milliseconds), jitter information 254 (e.g., expressed in milliseconds), round trip time (RTT) information 256 (e.g., to the home network (HN) gateway/AAA proxy node 126), and/or packet loss information 258. In some embodiments, assurance information carried in the IP-SLA VSA 230 may be represented as an average over a predetermined time window, for example, over a 'Z' minute window. In some embodiments, the time window may be a 5-minute period; however, other time windows can be envisioned. For example, in some embodiments, the time window may be varied (e.g., a shorter window during more busy periods and a larger window during less busy periods).

It is to be understood that the IP-SLA assurance information discussed for IP-SLA VSA 230 is provided for illustrative purposes only and is not meant to limit the broad scope of the present disclosure. Virtually any type of IP/network related performance/assurance information may be carried in an IP-SLA VSA in accordance with embodiments described herein.

Example RF-SLA assurance information that may be encoded in a RADIUS VSA is illustrated in FIG. 2C, which is a schematic diagram illustrating example details associated with an RF-SLA VSA 260 that can be appended to visited network 110 signaling communicated to home network 120 (e.g., an access and/or accounting request message for UE 102), according to an example embodiment. The RF-SLA VSA 260 may optionally be included in a given message by the visited network 110/AAA proxy node 116.

In at least one embodiment, RF-SLA VSA 260 may include a Type field 262, a Length field 264, a Vendor Identifier (ID) field 266, a Vendor Type field 268, a Vendor-length field 270, and various RF related performance/assurance information encoded in one or more TLV objects/data 280.

In at least one embodiment, Type field 262 can be set to a value (e.g., 26) indicating a VSA, Length field 264 can be set based on the size of the inter-operator tariff VSA 200, the Vendor ID field 266 can be set to a vendor-specific identifier (e.g., identifier for visited network 110), the Vendor Type field can be set to a value that indicates that the VSA is an RF-SLA VSA (e.g., a unique 8-bit value identifying the RF-SLA VSA type), and the Vendor-length field 240 may be set based on the size of the TLV data field 280.

In various embodiments, TLV data 280 carried in the RF-SLA VSA 260 may include Modulation and Coding Scheme (MCS) information 282, network wide channel utilization information 284, AP channel utilization information 286, and Received Signal Strength Indicator (RS_SI) information 288 (in decibels (dB)) for a roaming subscriber (e.g., UE 102). In at least one embodiment, MCS information may be expressed as an occupancy or percentage of connections for each of 12 possible modulation and coding schemes. In some embodiments, assurance information carried in the RF-SLA VSA may be represented as an average over a predetermined time window, for example, over a 'ZZ' minute window. In some embodiments, the time window may be a 5-minute period. For example, in some embodiments, the time window may be varied (e.g., a shorter window during more busy periods and a larger window during less busy periods).

It is to be understood that the RF-SLA assurance information discussed for RF-SLA VSA 260 is provided for illustrative purposes only and is not meant to limit the broad scope of the present disclosure. Virtually any type of RF related performance/assurance information may be carried in an IP-SLA VSA in accordance with embodiments described herein.

Consider an operational example discussed with reference to FIGS. 3A, 3B, 3C, and 3D, which are a call flow 300 associated with providing one or more wireless authorization(s) for UE 102 based on in-line assurance and tariffing information, according to an example embodiment. FIGS. 3A-3D include UE 102, access network 112/radio node 113, access network assurance system 114, and AAA proxy 116 of visited network 110, as well as, identity authentication/authorization system 122, roaming assurance system 124, and AAA proxy 126 of home network 120. For the embodiment of FIGS. 3A-3D, that access network 112 is an OpenRoaming WLA (e.g., Wi-Fi) access network.

Further for the embodiment of FIGS. 3A-3D, consider at 302 that identity authentication/authorization system 122 is configured (e.g., via memory/storage/a database/etc.) with multiple minimum service threshold levels, which may represent minimum levels of service, as may be characterized using RF and/or IP-SLA performance/assurance metrics, that may be expected by the home network 120 operator for service involving roaming subscribers (e.g., UE 102) for one or more visited networks. In at least one embodiment, a first threshold (Threshold #1) may represent a minimum level of service for all users subscribed to home network 120, a second threshold (Threshold #2) may represent a minimum level of service for roaming subscriber UE 102, and a third threshold (Threshold #3) may represent a minimum level of service for on-going service for roaming subscriber UE 102. In various embodiments, each threshold may be tied to a tariffing/cost levels (and/or ranges thereof) and any combination of RF/IP-SLA threshold levels (and/or ranges thereof). Other details related to configuring and/or updating various thresholds are discussed herein below with reference to various operations that may be performed by identity authentication/authorization system 122. In at least one embodiment, Threshold #3 may also be configured for roaming assurance system 124, via metric logic/database 125.

In at least one embodiment during operation for system 100, instrumentation or network performance metrics may be provided by the access network 112 to the access network assurance system 114, as shown at 304. In various embodiments, the performance metrics may be provided on a periodic basis, etc. The visited access network assurance system 114, via assurance logic 115, may calculate various RF and/or IP assurance metrics (e.g., MCS utilization, channel utilization, RS_SI, latency, jitter, RTT, etc.), which may include per-AP (e.g., radio node 113) metrics and/or network-wide metrics, as shown at 306.

In some embodiments, as shown at 308, one or more radio node(s) 113 for access network 112 may calculate their own metrics, which can be sent to access network assurance system 114 for calculation of network-wide metrics.

As shown at 310, consider that UE 102 seeks to connect to access network 112 and sends an access request message, which is obtained by the access network 112/radio node 113. The access request message includes a device identifier (ID) for UE 102, which, in various embodiments may be set to the Media Access Control (MAC) address for the UE, a virtual MAC address (vMAC) for the UE, a token, or the like In one embodiment, access network 112/radio node 113 (AP) forwards the access request, at 316, along with an ID for the access network/radio node (AP), to AAA proxy 116. In various embodiments, the access network/radio ID may be the built-in MAC address for the radio node, a host MAC (not used for a particular interface but rather as a unique identifier for the radio node), or the like. In the present embodiment, consider at 318 that AAA proxy 116, via signaling logic 117, recovers the access network ID and the device ID from called/calling station ID attributes. Using the network ID and the device ID, AAA proxy 116 queries access network assurance system 114 to recover, at 320, assurance metrics for any combination of UE 102, the accessing radio node/AP, the whole visited network 110, and/or inter-operator tariffing information for visited network 110 (e.g., if the visited network 110 operator expects to be remunerated for roaming subscriber service).

At 322, AAA proxy 116 appends the access request message with any combination of an IP-SLA VSA (e.g., 230), an RF-SLA VSA (e.g., 260), and/or an inter-operator tariffing VSA (e.g., 200) based on the recovered assurance metrics/tariffing information. At 324, AAA proxy 116 transmits the access request message, which includes the access network ID, and the appended assurance metrics and/or inter-operator tariffing information to AAA proxy 126 of home network 120.

Before discussing various home network operations, consider, in some embodiments that access network 112/radio node 113 may append SLA assurance metrics and/or inter-operator tariffing information to the access request message (e.g., at the point at which the RADIUS originated). For example, in an alternative embodiment, radio node 113 may calculate its own assurance metrics, as shown at 308. In this embodiment, upon obtaining the access request message, at 310, radio node 113 may query access network assurance system 114, as shown at 312, to recover assurance metrics for the entire visited network 110 and/or inter-operator tariffing information for visited network 110. At 314, the radio node 113 may then append the access request message with an IP-SLA VSA (e.g., 230), an RF-SLA VSA (e.g., 260), and/or an inter-operator tariffing VSA (e.g., 200) based on the recovered assurance metrics/tariffing information. Thereafter, radio node 113 can forward the access request message, which includes the access network ID, and the appended assurance metrics and/or inter-operator tariffing information to AAA proxy 116. In this embodiment, AAA proxy may forward the request message to AAA proxy 126 rather than performing the operations as discussed above at 318, 320, and 322.

In still some embodiments, UE 102 can signal tariffing/SLA information using IEEE 802.11 signaling or through Extensible Authentication Protocol (EAP) signaling. Thus, various operations for recovering/appending assurance metrics and/or inter-operator tariffing information to an access request message can be envisioned in accordance with embodiments herein.

Returning to the present example, consider that AAA proxy 116 (following the operations at 318, 320, and 322) transmits the access request message, at 324, which includes the access network ID, and the appended assurance metrics and/or inter-operator tariffing information to AAA proxy 126 of home network 120.

At 326, AAA proxy 126, via signaling logic 127, recovers the assurance metrics and/or tariffing information from the VSA(s) included in the access request message and transmits the metrics/information, along with the access network ID, to roaming assurance system 124. Continuing to FIG. 3B, at 328, roaming assurance system 124 updates a database of assurance metrics/tariffing information via metric logic/database 125. In some embodiments, operations at 328 may include roaming assurance system storing assurance metrics in association with tariffing information that may be identified based on the access network ID contained in the access request message.

At 330, the AAA proxy 126 forwards the access request message to identity authentication/authorization system 122. It is to be understood that operations 326 and 330 may be performed in parallel and/or in any order.

At 332, identity authentication/authorization system 122 recovers assurance metrics/tariffing information using the identifying information included in the access request message. In various embodiments, the identifying information may be the access network ID (e.g., AP ID), a site/Service Set Identifier (SSID) pair identifier (e.g., StadiumXpublicWLAN), or the like.

Broadly, functionality for authorizing access of a roaming subscriber (e.g., UE 102) for a visited access network (e.g., access network 112), may be defined via access logic 123 to perform operations based on information received with an access request as follows.

For a first step, access logic 123 may determine whether an inter-operator tariff VSA is included in an access request message to determine whether a given roaming policy is exceeded. This determination may be performed for any optional tariffing information that may be included in an inter-operator tariff VSA. In various embodiments, more than one roaming policy may be checked for the first step, which can be performed multiples during operation. For example, a first check can be performed against a group policy threshold that may be applicable to all roaming subscribers for home network 120 (e.g., Threshold #1). In another example, a second check can be performed against a specific subscriber roaming policy threshold, say, a roaming policy for UE 102 (e.g., Threshold #2) that can be checked following authentication of UE 102.

If a given tariffing policy is exceeded, then the access-request can be rejected and an indication may be provided indicating an excessive tariff. In various embodiments, the rejection can be transparent to the UE 102 user (e.g., mobile device silently stays on 4G/LTE or 5G) and/or may be accompanied with user messaging (e.g., a message indicating, "the Wi-Fi network charges excessively for your connection and cannot be automatically joined"). This mechanism may also allow the user to manually override such a blockage (and thus may be charged upon connection). In one embodiment EAP notification may be used to carry in the message in an EAP-method agnostic manner.

For a second step, access logic 123 may determine whether an inter-operator tariff VSA included is included in an access request message in order to determine whether one or more SLA/service level thresholds are to be updated. In some embodiments, access logic 123 may update SLA thresholds (e.g., any of Thresholds #1, #2, and/or #3) based on the presence an inter-operator tariff VSA being included or not being included in an access request message. For example, if tariffing is high, then the SLA/service level thresholds that were configured at 302 may be increased to be more strict (e.g., setting a higher level of service expected by the home network 120); however, if tariffing is low and/or of no tariffing information is included, the SLA/service level thresholds can be lowered. In some implementations, tariffing details indicating 'high', 'low', etc. may be based on user configurations for a UE, subscription information, provider information, etc.

Additionally, if optional tariffing information is included, the SLA thresholds can be further amended. For example, if optional data usage rate information is included in an inter-operator tariff VSA, the SLA thresholds can be further amended according to various values of rating information contained in the VSA.

For a third step, access logic 123 may determine whether an IP-SLA VSA and an RF-SLA VSA is included in the access request message. In one example, if the inter-operator-tariff VSA is included and IP-SLA and RF-SLA assurance metrics are not included, then based on policy, for example, the access request may be rejected. An out of policy indication can be provided indicating presence of a tariffed access and no SLA assurance information. In another example, say if an inter-operator tariff VSA is included and indicates that the tariff is low, then based on policy, for example, the access request may be allowed even if SLA VSAs are not included in an access request. Other variations can be envisioned for allowing/permitting or rejecting/denying authorizations based on various combination(s) of policies, tariffing levels, SLA thresholds, and/or SLA assurance metrics obtained.

In some embodiments, user-contracted IP-SLA and/or RF-SLA information, application-based IP- and/or RF-SLA information, enterprise-contracted IP- and/or RF-SLA information, and/or the like may also be obtained by the identity authentication/authorization system 122. For example, identity authentication/authorization system 122 may obtain such information in-line via VSA(s) included with an access request message, may obtain such information from application provider(s), may obtain such information based on SLAs set for all subscribers of a given SP/IDP (e.g., which can be used for configuring/updating Threshold #1), and/or may obtain such information from a subscriber/roaming policy (e.g., which can be used for configuring/updating Threshold #2). In still some embodiments, such information may be defined on the basis of providing an initial connection/service and may also be defined on the basis of on-going service (e.g., for configuring/updating Threshold #3). In some implementations, UE 102 may include SLA information pre-configured therein and/or obtained from an application/service provider for updating one or more SLA thresholds.

For embodiments in which different SLA information may be obtained from different sources, the SLA information may be ranked or otherwise ordered based on the source from which each SLA was obtained such that different SLA thresholds may be set based on the ranking. Other variations can be envisioned.

For a fourth step, access logic 123, may compare the contents of the IP-SLA and/or RF-SLA assurance metrics against one or more SLA thresholds, which can include thresholds configured at 302 and/or amended thresholds, as discussed above for the first step. In one example, if 'n' out of 'm' thresholds are not met (say, 6 out of 10, etc.), then the access request can be rejected. An out of policy indication can be provided to UE 102 indicating the assurance level is below threshold. In some embodiments, the 'n' and/or 'm' number(s) of thresholds can be varied depending on different tariffing levels/ranges/etc. (e.g., high or low) indicated by the visited network 110. Other variations can be envisioned.

In some embodiments, IP service level thresholds may be utilized such that if reported assurance metrics (or an 'n' of 'm' reported metrics) are below their corresponding thresholds levels for a given threshold, then the IP service level thresholds may be considered satisfied. In some embodiments RF service level thresholds may be utilized such that if reported RSSI is above a given RSSI threshold, then the threshold may be considered satisfied. In some embodiments, RF service level thresholds may be utilized such that if reported channel utilization (CU) is below a given CU threshold, then the threshold may be considered satisfied. In still another embodiment, an MCS threshold for RF service level thresholds may be characterized based on configured bandwidth (e.g., 20 megahertz (MHz), 40 MHz, or 80 MHz) in which if a reported percentage of connections may have an MCS greater than a certain level, then the MCS threshold may be considered satisfied.

Similar to the first step, rejections that may occur in the third or fourth steps can be transparent to the user (e.g., phone silently stays on LTE) and/or may be accompanied with user messaging (e.g., "the Wi-Fi network does not offer appropriate conditions for you to connect. We will try again when you are closer to the Wi-Fi APs,"). It is understood that, in the case of failed SLA, subsequent attempts can happen at intervals as the client continues scanning and the detected conditions reported by the infrastructure may change.

In various embodiments, checks between reported assurance metrics/tariffing information and SLA threshold levels/tariffing information can be performed for any combination of threshold levels/policies using any combination of the first, second, third, and/or fourth discussed steps for any of: service provider/enterprise policies applicable to all subscribers of the service provider/enterprise, subscriber-specific policies, on-going service related policies (e.g., for updated assurance metrics/checks that can be obtained periodically, etc. during a call/user session), and/or the like. Further, even once a subscriber/UE is authorized, there can be updated level(s) in accounting message(s) that may subsequently lead to a session being terminated at a later time. In some instances, assurance checks can also be performed by roaming assurance system 124, via metric logic/database 125, for on-going service checks.

Figure 3A:
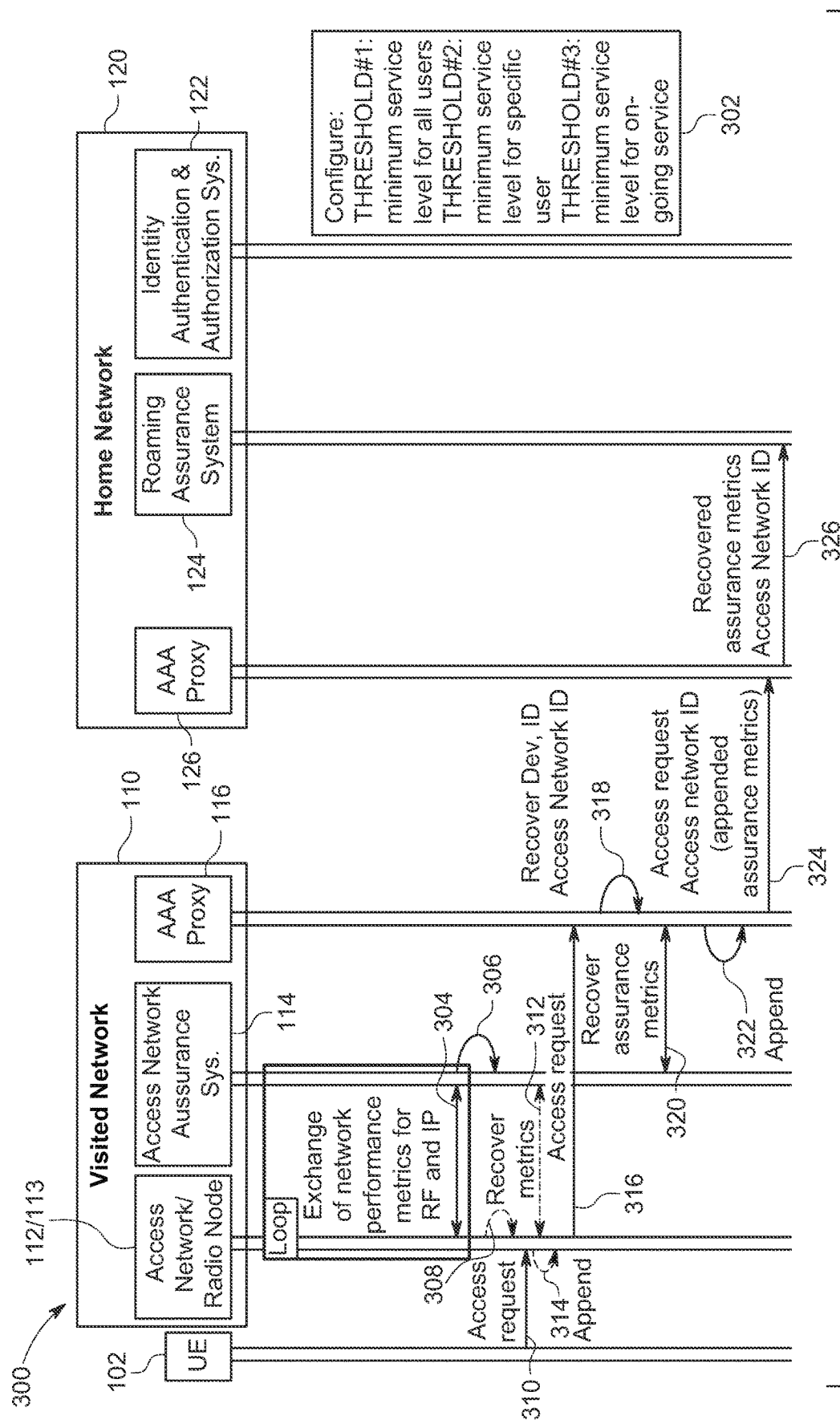
FIGS. 3A, 3B, 3C, and 3D are a message sequence diagram illustrating a call flow associated with providing wireless authorization for a user equipment based on in-line assurance and tariffing information, according to an example embodiment.
Figure 3B:
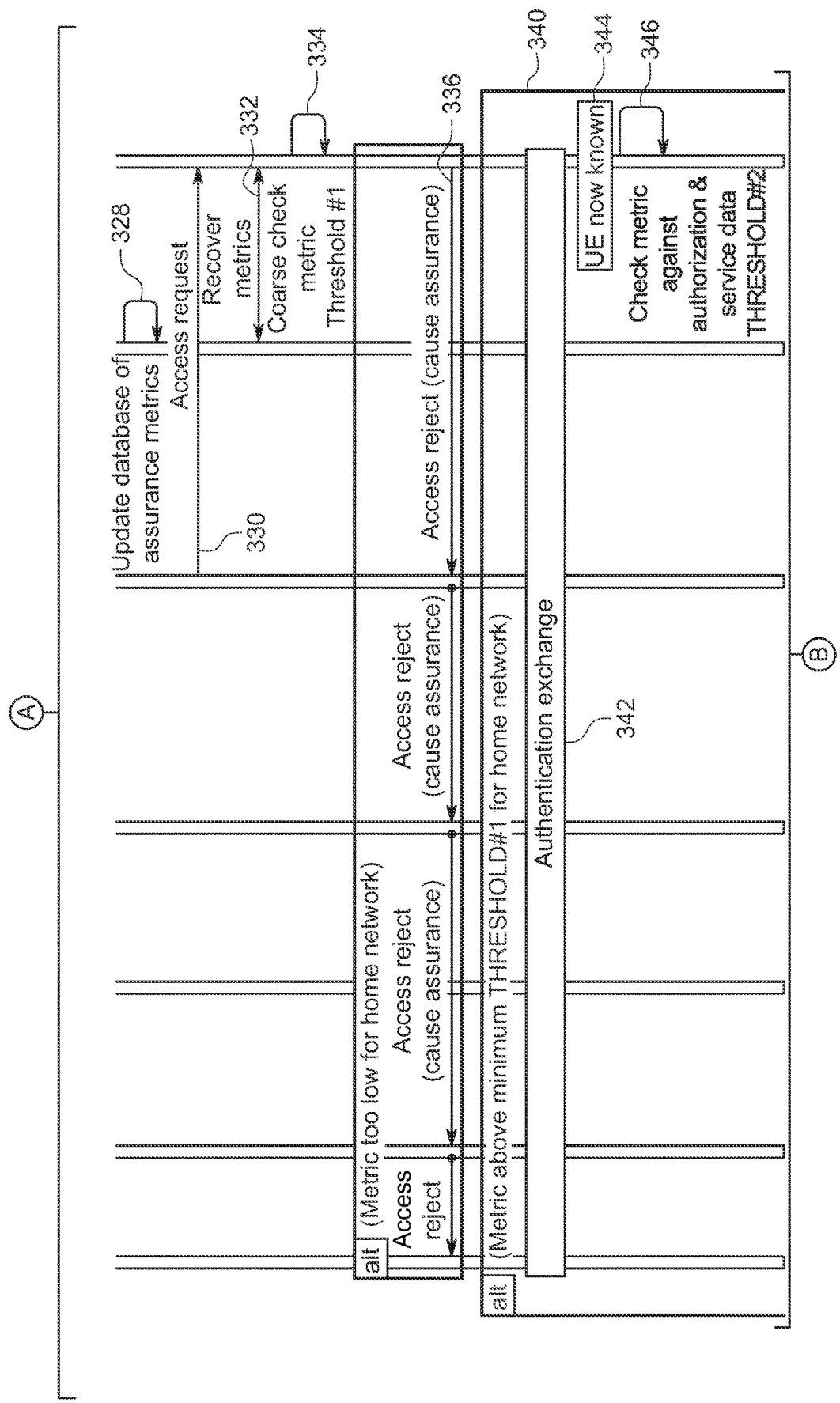
Figure 3C:
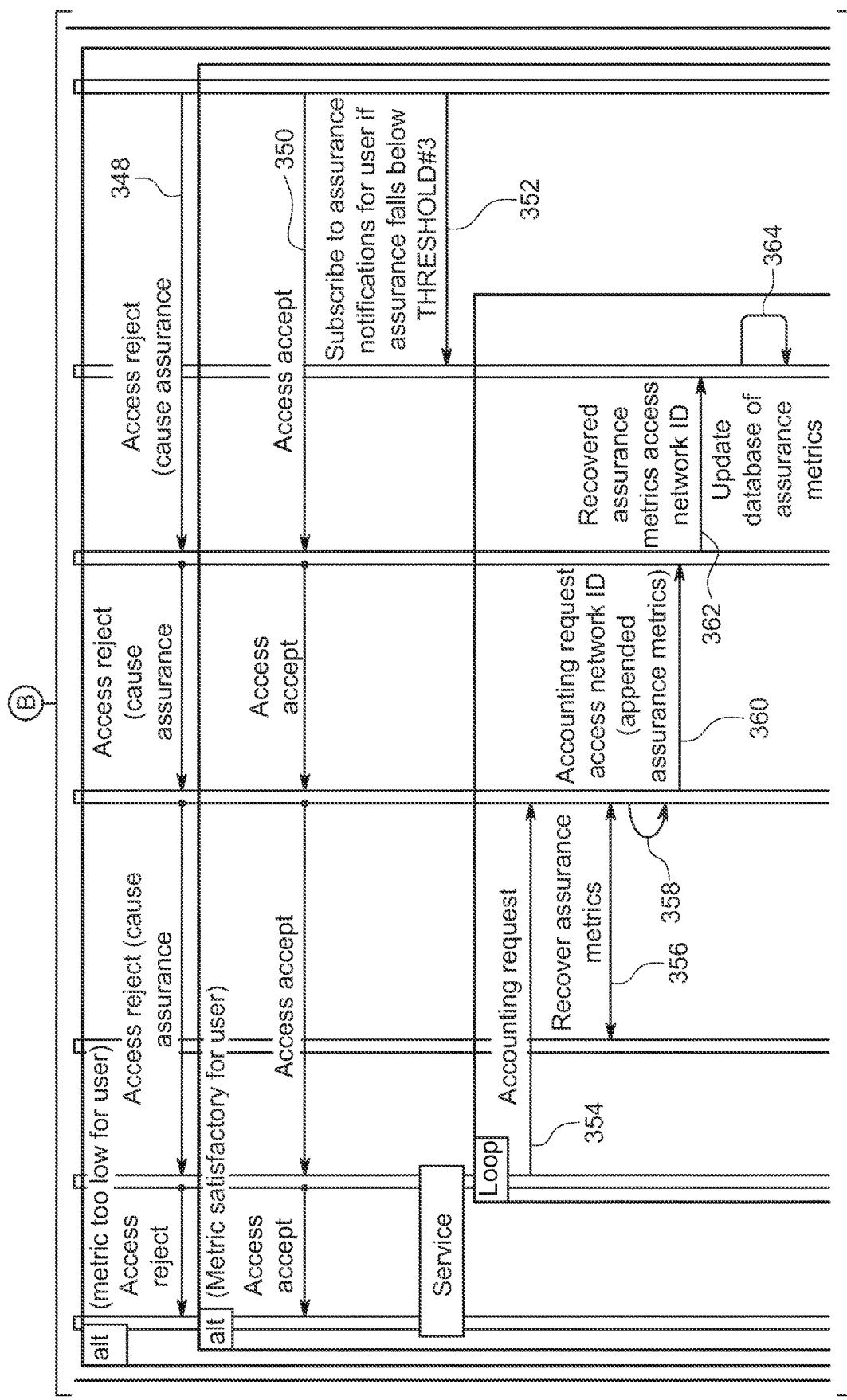
Figure 3D:
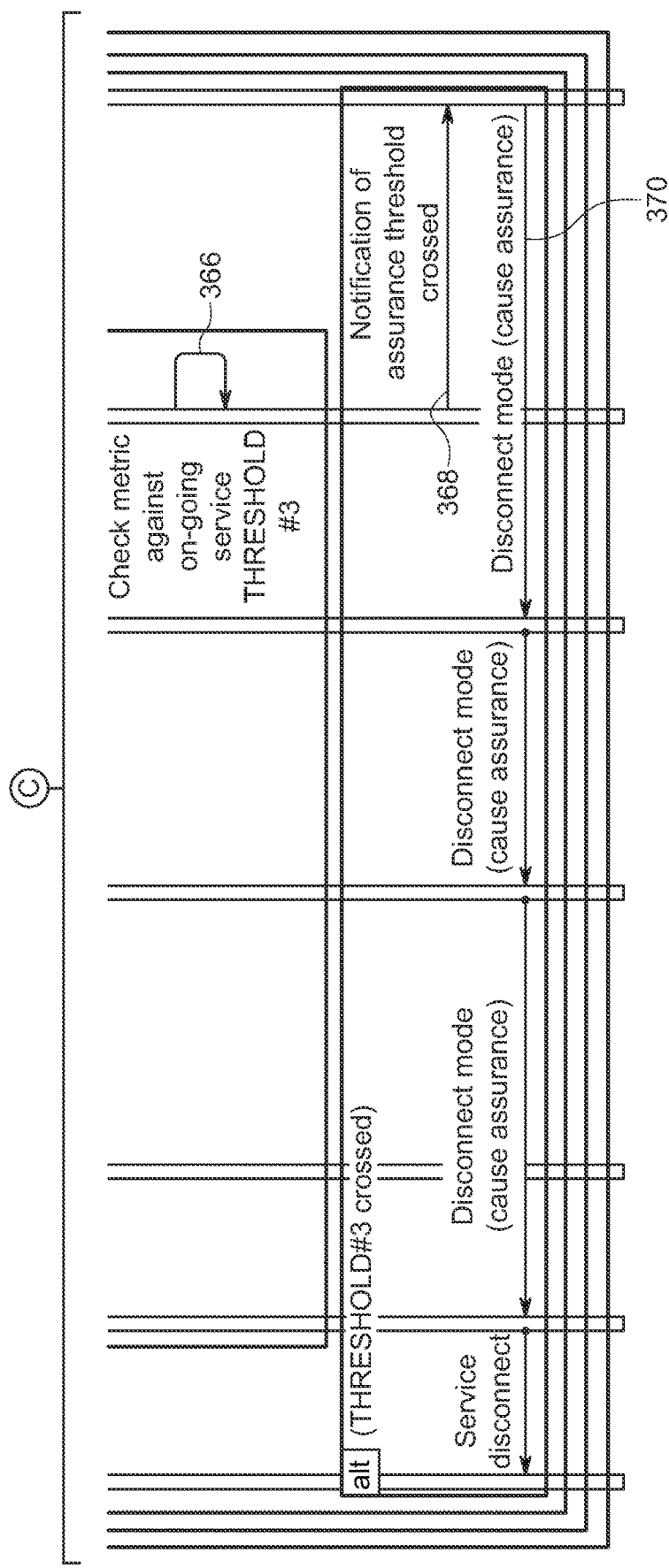

Consider an example, as shown in FIG. 3A at 334 in which identity authentication/authorization system 122, via access logic 123, may perform a coarse metric check against Threshold #1 involving group-level policy threshold(s) for comparison(s) involving any combination of RP and/or IP service level threshold(s), which may have been updated based on the presence of and/or tariffing information (e.g., high or low) included in an inter-operator tariff VSA for the access request message, and the RF and/or IP assurances metrics that may have been included for the access request message. If, for example, the assurance metrics fail to satisfy the service level threshold(s) for Threshold #1 (e.g., an 'n' number of reported assurance metrics are below an 'm' number of service level threshold(s)), the identity authentication/authorization system 122, via access logic 123, may transmit an access reject message including an assurance cause indicating that the assurance level is below threshold, as shown at 336, which may be communicated to UE 102 via AAA proxies 126/116 and access network 112/radio node 113.

Consider other example operations that may be involved when the reported assurance metrics are above the threshold(s) for Threshold #1, as shown at 340. For example, at 342, an authentication exchange (e.g., an EAP exchange) may be performed between UE 102 and identity authentication/authorization system 122 in which the UE 102 is authenticated to the home network 120 using standards-based authentication procedures. Upon successful authentication, the UE 102 is known to identity authentication/authorization system 122, as shown at 344.

Subsequently, at 346, identity authentication/authorization system 122, via access logic 123, may perform a metric check against Threshold #2 for subscriber-specific authorization and service policy information involving comparison(s) for any combination of RP and/or IP service level threshold(s), which may have been updated based on the presence of and/or tariffing information (e.g., high or low) included in an inter-operator tariff VSA for the access request message, and the RF and/or IP assurances metrics that may have been included for the access request message. If, for example, the assurance metrics fail to satisfy the service level threshold(s) for Threshold #2 (e.g., an 'n' number of reported assurance metrics are below an 'm' number of service level threshold(s)), the identity authentication/authorization system 122, via access logic 123, may transmit an access reject message including an assurance cause indicating that the assurance level is below threshold, as shown at 348 of FIG. 3C in which the message may be communicated to UE 102 via AAA proxies 126/116 and access network 112/radio node 113.

Consider other example operations that may be involved when the reported assurance metrics are above the threshold(s) for Threshold #2. For example, under an assumption that the reported assurance metrics are determined to be above the subscriber-specific threshold(s) for Threshold #2, the identity authentication/authorization system 122, via access logic 123, may transmit an access accept message, as shown at 350, which may be communicated to UE 102 via AAA proxies 126/116 and access network 112/radio node 113.

At 352, identity authentication/authorization system 122, via access logic 123, may subscribe to assurance notifications from roaming assurance system 124 for UE 102 to determine if assurance metrics fail to meet one or more on-going service threshold(s), as may be characterized by Threshold #3. Recall, at 304, that access network 112/radio node 113 and access network assurance system 114 may exchange performance metrics for calculating AP, UE, and/or system-wide metrics and/or radio node 113 may calculate various performance metrics (as discussed for 308) and perform one or more exchanges with access network assurance system 114. Such operations may be performed throughout on-going service for UE 102 to update various performance metrics.

Various on-going (e.g., looping) service assurance operations may be performed via roaming assurance system 124, which may, in at least one embodiment, include access network 112/radio node 113, sending an accounting request to AAA proxy 116, as shown at 354, to trigger recovery of assurance metrics via access network assurance system 114, as shown at 356, which can be appended to the accounting request, as shown at 358, and forwarded to AAA proxy 126, as shown at 360. In some embodiments, however, access network 112/radio node 113 may perform such calculations (e.g., as discussed at 308), perform exchanges with access network assurance system 114 (e.g., as discussed at 312), and append metrics (e.g., as discussed at 314), to the access request message.

At 362, AAA proxy 126, via signaling logic 127, recovers the assurance metrics from the VSA(s) included in the accounting request message and transmits the information, along with the access network ID, to roaming assurance system 124. At 364, roaming assurance system updates its database via metric logic/database 125. Continuing to FIG. 3D, at 366, roaming assurance system 124 may perform a metric check against Threshold #3 for on-going service policy information involving comparison(s) for any combination of RP and/or IP service level threshold(s), which may have been previously updated, and the RF and/or IP assurances metrics that may have been included for the accounting request message. If, for example, the assurance metrics fail to satisfy the service level threshold(s) for Threshold #3 (e.g., an 'n' number of reported assurance metrics are below an 'm' number of service level threshold(s)), the roaming assurance system 124, may transmit a notification to identity authentication/authorization system 122, as shown at 368. Such a notification may trigger identity authentication/authorization system 122 to transmit a disconnect including an assurance cause indicating that the assurance level is below threshold, as shown at 370, which may be communicated to UE 102 via AAA proxies 126/116 and access network 112/radio node 113.

Figure 4:
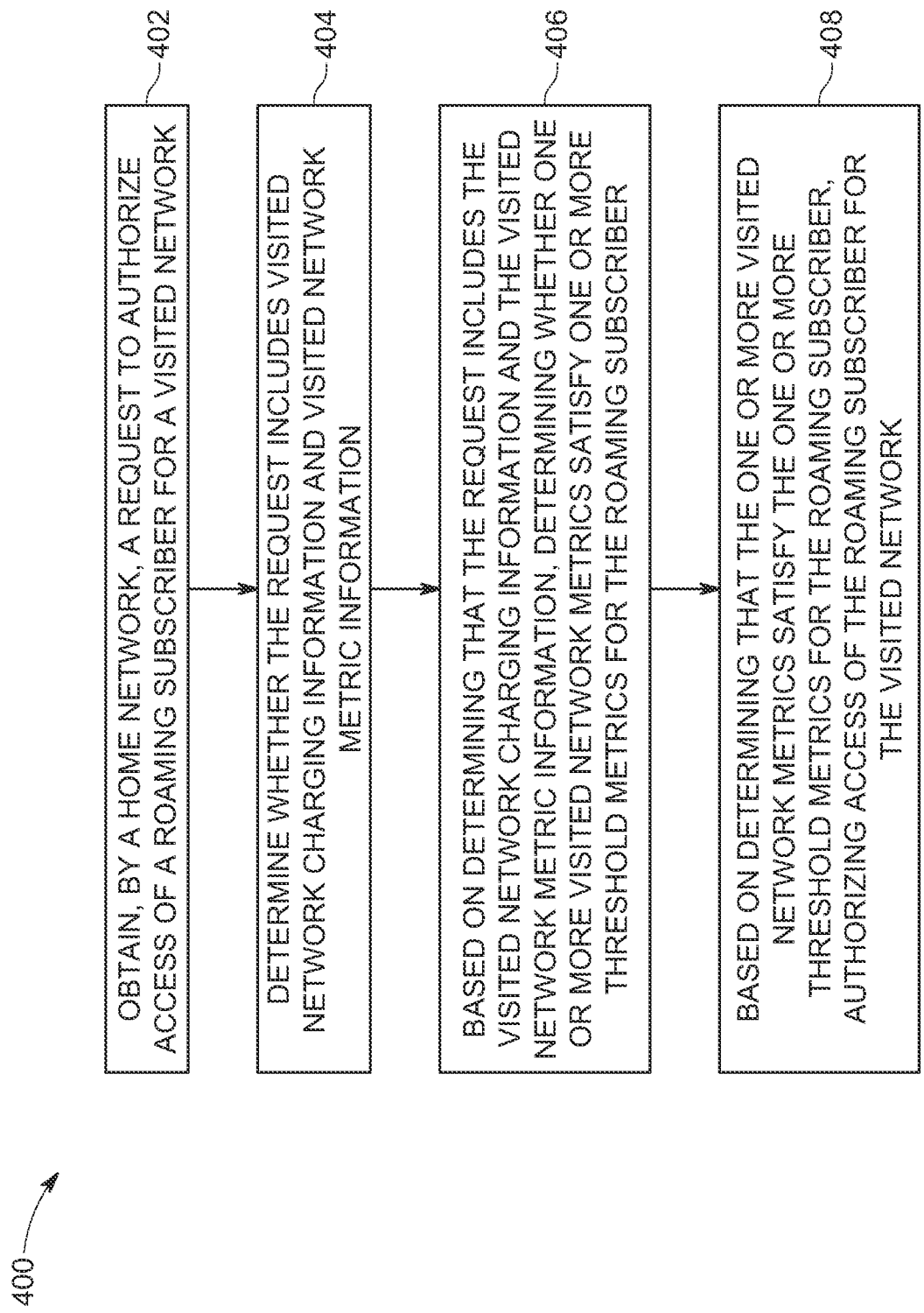
FIG. 4 is a flow chart depicting a method according to an example embodiment.

Referring to FIG. 4, FIG. 4 is a flow chart depicting a method 400 according to an example embodiment. In at least one embodiment, method 400 illustrates example home network operations that may be associated with determining access decisions for a UE for connecting to a visited network, according to an example embodiment. In one instance, operations associated with method 400 may be performed by an AAA element, such as identity authentication/authorization system 122 via access logic 123.

At 402, the method may include obtaining, by a home network (e.g., identity authentication/authorization system 122 for home network 120), a request to authorize access of a roaming subscriber for a visited network (e.g., a request to authorize access of UE 102 to connect to access network 112 of visited network 110).

At 404, the method may include determining whether the request includes visited network charging information (e.g., an inter-operator tariff VSA) and visited network metric information (e.g., an RF-SLA VSA and/or an IP-SLA VSA).

At 406, the method may include, based on determining that the request includes the visited network charging information and the visited network metric information, determining whether one or more visited network metrics satisfy one or more threshold metrics for the roaming subscriber.

At 408, the method may include, based on determining that the one or more visited network metrics satisfy the one or more threshold metrics for the roaming subscriber, authorizing access of the roaming subscriber for the visited network. In at least one embodiment, the operations may include determining that the visited network charging information satisfies one or more charging thresholds for the roaming subscriber prior to authorizing access of the roaming subscriber for the visited network.

Recall, as discussed herein that different other operations may be performed. For example, if the request includes visited network charging information but does not include visited network metrics, then the request may be rejected in some embodiments. In another example, one or more threshold metrics may be updated based on a presence and a level (e.g., high or low) of visited network charging information. In yet another example, determining whether the one or more visited network metrics satisfy the one or more threshold metrics can be performed using a group-level policy in addition to a subscriber-specific policy. Still further, the method can include, following the authorizing, obtaining one or more updated visited network metrics; determining whether the one or more updated visited network metrics satisfy one or more on-going/continued service threshold metrics for the roaming subscriber; and disconnecting the roaming subscriber based on determining that the one or more updated visited network metrics fail to satisfy the one or more on-going/continued service threshold metrics for the roaming subscriber.

Accordingly, techniques presented herein may be utilized to ensure that a user engaged in contractual SLAs with an IdP is not offloaded unwillingly into a Wi-Fi network where these SLAs would not be met.

The in-line techniques presented herein may provide various advantages over other Wi-Fi roaming architectures, such as the Wireless Broadband Association's Wireless Roaming Intermediary eXchange (WRIX). For example, in at least one embodiment, techniques presented herein may advantageously provide for the ability to enable different tiers or levels of service such as any combination of SP/IdP service thresholds that may be applicable to all subscribers of an SP/IdP, subscriber-specific service thresholds, application-specific thresholds, initial vs. ongoing service thresholds, etc. These different tiers or levels of service may be utilized during service authorization decisions involving both tariffing and SLA information in order to determine whether to allow or deny a client from connecting to an OpenRoaming access network.

Figure 5:
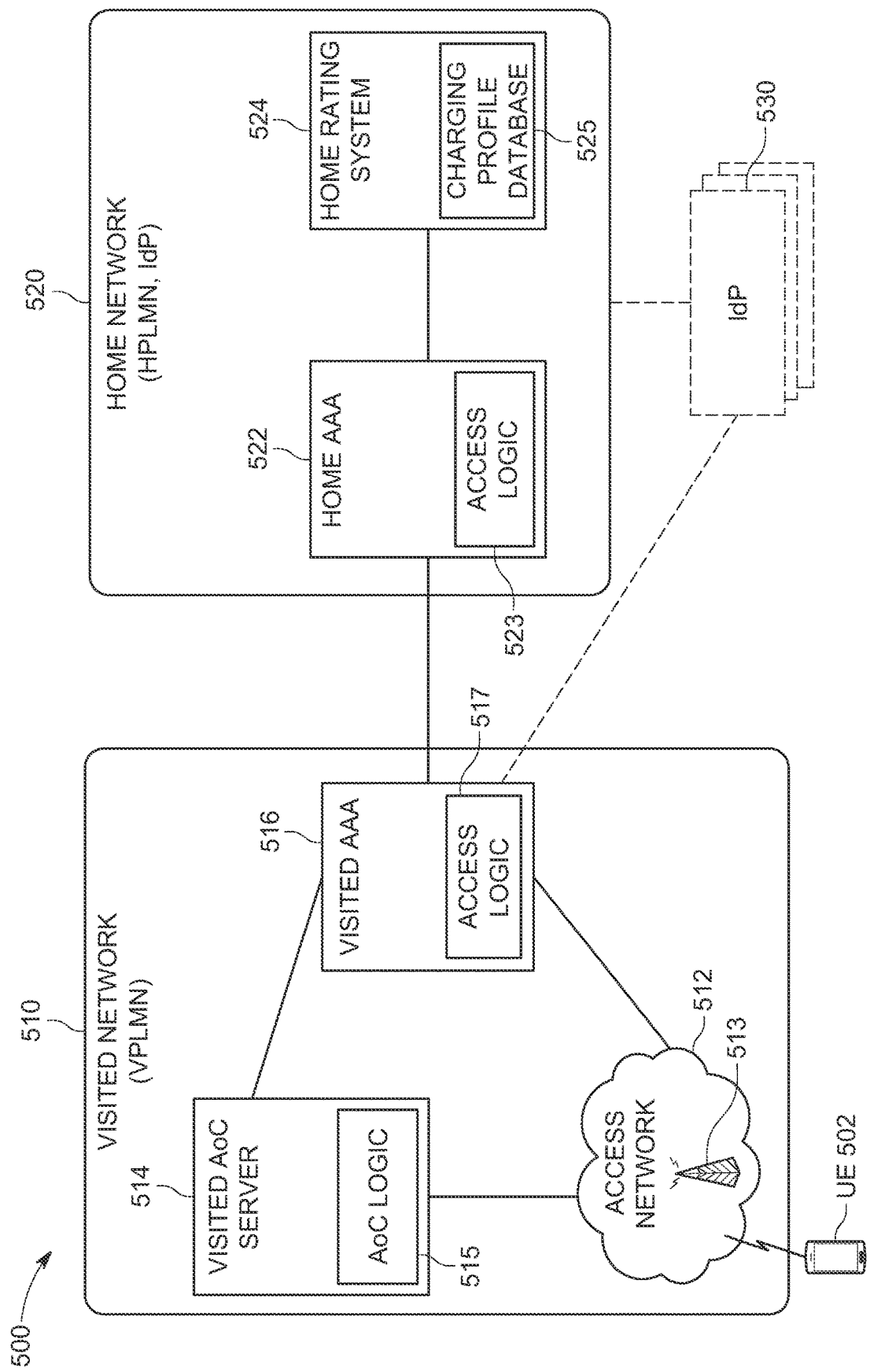
FIG. 5 is a diagram of a system in which advice of charge (AoC) techniques may be implemented, according to an example embodiment.

Referring to FIG. 5, FIG. 5 is a block diagram of a system 500 in which techniques that facilitate delivering and utilizing an access network-neutral advice of charge (AoC) schema may be implemented, according to an example embodiment. System 500 may include a visited network 510 and a home network 520. In one instance, visited network 510 may be considered a VPLMN 510 and home network 520 may be considered a HPLMN 520. Home network 520 may be associated with a SP. In some instances, the home network 520 may be considered an IdP. At least one UE 502 is also shown in system 500. For various discussions herein, a user that may be associated with a given UE (e.g., the UE operator, UE owner, employee assigned to the UE, etc.) may be discussed in conjunction with various example use cases.

Visited network (VPLMN) 510 may include an access network 512, a visited AoC server 514, and a visited AAA entity 516. Access network 512 may include one or more radio node(s) or AP(s) 513. Visited AoC server 514 may include AoC logic 515 and visited AAA 516 may include access logic 517. Each element/node/system of visited network 510 may be capable of interfacing with each other for performing various operations discussed herein.

Home network (HPLMN, IdP) 520 may include a home AAA entity 522, including access logic 523, and a home rating system 524, including a charging profile database 525, which may be configured with charging profile information for one or more roaming subscribers associated with home network 520, such as roaming subscriber/UE 502. Each element/node/system of home network 520 may be capable of interfacing with each other for performing various operations discussed herein.

Visited AAA 116 may interface with home AAA 522. It is to be understood that any number or combination of routing and/or proxy AAA nodes may be present in system 500 to facilitate interfacing between visited AAA 516 and home AAA 522.

Access network 512 may be inclusive of one or more RANs for one or more RAT types that may be provided via any combination of with radio nodes 113 (also referred to as APs), which may include any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate access network connections for one or more elements of system 500.

In various embodiments, access network 512 via one or more radio node 513 may provide RAN coverage for any combination of licensed spectrum WWA access networks, such as 3GPP access networks (e.g., 4G/LTE, 5G, nG, etc. access networks), unlicensed spectrum non-3GPP WLA access networks (e.g., IEEE 802.11 (Wi-Fi®), IEEE 802.16 (WiMAX®), etc. access networks), unlicensed spectrum 3GPP access networks (e.g., LAA, eLAA, 5GNRU, etc. access networks), and/or the like. Thus, radios/access points 513 for access network 512 may include any combination of 4G/LTE eNBs, 5G/nG gNBs, Wi-Fi® APs, and/or any other radio devices now known here or hereafter developed that may facilitate over-the-air RF connections with one or more devices, such as UE 502. For embodiments herein, access network 512 may further be representative of an Open-Roaming access network.

In various embodiments, UE 502, may be associated with any user, subscriber, employee, client, customer, electronic device, etc. wishing to initiate a flow in system 500 and may be inclusive of any device that initiates a communication in system 500, such as a computer, an electronic device such as an industrial device, automation device, enterprise device, appliance, IoT device, etc., a laptop or electronic notebook, a cellular/Wi-Fi® enabled telephone/smart phone, tablet, etc. and/or any other device, component, element, or object (e.g., a dual connection enabled device) capable of initiating voice, audio, video, media, or data exchanges within system 500. It is to be understood that UE 502 may be configured with any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate over the air RF connections with one or more access networks.

In the past, the way access networks were rated could be derived from their access technologies. For example, 3GPP access networks were generally charged, whereas, IEEE 802.11 access networks, such as Wi-Fi® access networks were generally free of charges. This has led to a default assumption that applications should be switched automatically over Wi-Fi® with user preferences then being used to enable or disable application flows over cellular. Moreover, the same assumptions have been embedded in access network selection, for example, with Apple® operating systems preferring Wi-Fi® networks protected using pre-shared keys, over those that use Passpoint® based authentication (which is more commonly associated with carrier Wi-Fi® networks, and therefore assumed to be charged). Apple® is a registered trademark of Apple Inc.

This status quo is being challenged with the introduction of private 3GPP networks (e.g., enterprise operated 3GPP networks provided for private enterprise users/devices as opposed to public service provider operated 3GPP networks provided for any SP subscribed users/devices) as well as the use of Passpoint® authentication in settlement-free use cases, such as those typified by the OpenRoaming initiative. Thus, what is needed is a universal advice of charge (AoC) approach that enables devices and/or users to determine how any access network is being charged.

Techniques presented herein may provide a JSON schema and API that enables devices to recover advice of charge (AoC) information or, more broadly, charging policy metadata, associated with a provisioning domain/realm (e.g. an identity provider) in an access technology neutral manner. Based on such recovered charging policy metadata, a device and/or device use may determine one or network identities for which to utilize for connecting to one or more access network(s).

In at least one embodiment, a JSON schema 600, as illustrated in FIGS. 6A and 6B, may be defined for carrying an AoC policy or, more broadly, charging policy metadata, which may also be referred to herein as an 'AoC object'. The schema 600 may enable an access network-neutral delivery of charging information for a given roaming subscriber, such as UE 502. For example, information may be stored via the schema within visited network 510 via visited AoC server 514 and/or by an IdP, such as home network 520 via home rating system 524 and/or IdP(s) 530, for delivery to the visited network 510 and/or a roaming subscriber, such as UE 502.

As illustrated in FIGS. 6A and 6B, the schema 600 may define an indication, 'provisioningDomain' that may indicate the provisioning domain or realm (e.g., @example.com) or, more broadly, an identity provider, to which the AoC information/charging policy metadata applies, as shown at 602. At 604, the schema 600 may define an indication, 'chargingType', which can be used to indicate whether an access is metered or unmetered.

Additionally, the schema 600 may define an indication, 'chargeableEntity', which may be utilized when the access is metered to indicate whether a user or a sponsor will be charged for access, as shown at 606 for FIG. 6B. As shown at 608, the schema 600 may also define an indication, 'chargeableUnit', which can be used to indicate how the access is metered, whether on a time basis, a volume basis, a session basis, and/or any combination and/or extension/enhancement thereof.

The schema 600 may also define the ability to indicate, via 'additionalUnmeteredServiceIdentities', a set of application service identifiers that are unmetered, as shown at 610.

In some embodiments as a particular application of the application service identifiers (610), the schema 600 may also define the ability to indicate one or more applications that have specific metering characteristics (e.g., application 1 charged per unit of time, application 2 charged per volume/session, application 'N' uncharged for first 'X' units of time/volume then charged at rate 'Y' for each additional unit, to entity 'Z', etc.).

AoC techniques herein may provide for the ability to enable a Uniform Resource Identifier (URI) to be derived on any access network. For example, a Fully Qualified Domain Name (FQDN) can be defined, such as "localdomain/api/va/advice-of-charge" or the like, through which a host (e.g., visited network 510) can recover AoC information, such as an AoC policy or, more broadly, charging policy metadata, for a roaming subscriber. In some embodiments, AoC information/charging policy metadata may be protected using a certificate with a Subject Alternative Name:DNS:localdomain.

AoC information/charging policy metadata (e.g., an AoC object), may be signaled using JSON object via Access Network Query Protocol (ANQP) signaling for which various examples are shown below:

{"charging_type": "unmetered"}
{"charging_type": "metered", "chargeable_entity": "user", "chargeable_unit": "time"}
{"charging_type": "metered", "chargeable_entity": "user", "chargeable_unit": "volume"}
{"charging_type": "metered", "chargeable_entity": "sponsor", "chargeable_unit": "session"}

The example JSON schema and signaling illustrated herein are provided for illustrative purposes only and are not meant to limit the broad scope of the present disclosure. Accordingly, other variations for a JSON schema and AoC information/signaling can be envisioned.

Broadly, AoC techniques facilitated via system 500 may include various operations such that as a device (UE 502) and network (visited network 510/home network 520) may implement this schema, the device may:

1 Before accessing any network, learn if the network is chargeable in general or not. Generally, accessing a network may include attempting an 802.11 association and obtaining AAA SLA, profiles, etc. For example, as a user enters a venue having a certain network, they are typically not connected, not associated, and have not accessed the network.

2. Before accessing a network, query the chargeability of one or more specific applications, e.g. voice dialer, voice over-the-top (OTT), a specific game, data upload to a specific Cloud service provider (e.g. a cloud backup provider), data download from specific provider (e.g. a video streaming service), etc. Thus, continuing the example from (1), the device may exchange messages with an AP, with the goal of learning the access conditions (e.g., costs, etc.)

3. Before accessing a network, compare the chargeability of application usage between two or more networks, irrespective of the access methods (e.g., CBRS or private 3GPP versus public HotSpot); thus, enabling the ability to choose a cheaper network for a target application. Continuing with the examples above, upon determining an acceptable charging, the device attempts association, which is an exchange of 802.11 frames in which the goal is to obtain an association ID (AID) with an access point. The association phase includes a strict wireless phase (802.11 authentication, 802.11 association) followed by an 802.1X phase (through the AP, access to the IdP and exchange of conditions). Once association completes any message sent through the AP is part of the access. This can include mechanical messages like DHCP messages, Domain Name System (DNS) messages, discovery messages such as Allocation and Retention Priority (ARP), etc. These messages 'may' be free, but 'may' also be charged in some networks. The user can then start an application of interest (e.g., video conferencing, etc.) and since the device is now connected to the network, it is able to send and receive flows of applications of interest.

4. Once connected to a network, obtain real time updates on chargeability of one or more applications (e.g., flash sponsored free access for 'X' time/volume units for a specific network/application).

5. Before or after accessing a network, obtain connection parameters associated with the network/application charge parameters (e.g., application 1 free of use on network 'X', with bandwidth/latency/delay targets of A; charge of 'Y' on network z, with bandwidth/latency/delay targets of B); thus, enabling the user/device (manually or automatically) to decide an appropriate cost/performance network for the target application.

Generally, home network 520, via home rating system 524/charging profile database 525, may provide for verifying an identity of a user/UE (e.g., UE 502) and/or, in some instances may also provide some additional policy or policies to the visited network 510. Thus, in some instances, the home network 520 may be considered an Identity Provider (IdP) for embodiments herein. In some instances, home network 520 may interact with one or more third-party IdPs 530, as shown in FIG. 5, (e.g., for instances where a user/UE may be using multiple identities to maximize their policy) to provide one or more policies to visited network 510 and/or the user/UE. In still some instances, visited network 510 may interact with one or more third-party IdPs 530 to determine one or more policies for a user/UE regardless of whether the home network 520 also authenticates/identifies the user/UE. Thus, various visited network 510, home network 520, and/or IdP 530 interactions may be facilitated through different embodiments as discussed in further detail below with reference to FIGS. 7-15.

To illustrate various operations related to how an application/device/roaming subscriber, access network, home network, and/or IdP backend exchange of charges/AoC information/charging policy metadata may be performed, consider FIGS. 7-15, which illustrate various example message sequence diagrams illustrating example call flows for various operations that may be performed via AoC techniques provided herein, according to various example embodiments. Messaging utilized for FIGS. 7-15 may be formatted in a JSON format in which JSON queries may be signaled using ANQP for one or more charging model(s)/charging policies for one or more identity realms may be performed by a roaming subscriber (e.g., UE 102) in order to obtain charging policy metadata for the charging models/charging policies for the one or more identity providers and/or applications.

FIGS. 7-15 are discussed with reference to a WLA access, such as Wi-Fi, however, it is to be understood that AoC techniques discussed herein may be extended to any case involving dual connection with the potential to offload one of the connections.

To begin, FIGS. 7, 8, and 9 are discussed with reference to each other in which operations for FIG. 7 may continue to operations discussed for FIG. 8, and may further continue to operations discussed for FIG. 9. Referring to FIG. 7, FIG. 7 illustrates an example use case 700 involving a pre-access charge query performed between roaming subscriber UE 502 and visited network 510. For example, at 702 the visited network signals (via access network 512/radio node 513) that it is a chargeable network. In various embodiments, the signaling may be performed through beacons and/or through action frames using ANQP, which is designed in 802.11u. Upon determining that the visited network 510 is a chargeable network, the UE 502 queries the visited network 510 (pre-association), at 704, for charging policy metadata using an identity associated with an identity provider, such as an identity realm '@provider1.com'.

In various embodiments, an identity associated with an identity provider may be a general identity realm (e.g., '@provider1.com') or may be a user-specific identity for a given identity realm (e.g., 'userA@provider1.com').

At 706, the visited network 510 performs a local policy check via AoC server 514/AoC logic 515 for the identity realm and returns charging policy metadata for a charge model/policy for the identity realm, as shown at 708 (e.g., up to 30 GB or 30 minutes is free, then $2 every 10 minutes thereafter).

Various potential reactions/operations of the UE 502 are examined below with reference to FIGS. 8 and 9.

Referring to FIG. 8, FIG. 8 illustrates an example use case 800 in which the UE 502 attempts multiple, pre-access identity charge queries (e.g., performs multiple 'what-if' queries) that may involve testing (pre-association) the first identity as shown in FIG. 7 (performing a first query using '@provider1.com', as shown at 704), testing a second identity for a second identity realm (e.g., '@provider2.com'), as shown at 802, and/or possibly many more (pre-association), and collecting/obtaining charging policy metadata for the charge policy/model for each identity. As shown in FIG. 8, at 804, visited network 510 performs a local policy check via AoC server 514/AoC logic 515 for the second identity realm and returns charging policy metadata for the charge policy/model associate with the second identity realm, as shown at 806 (e.g., up to 30 GB or 10 minutes is free, then $2 every 10 minutes thereafter).

As shown at 808 and 810, the UE 502 can choose to associate with the first identity realm ('@provider1.com') that provides an appropriate charge model (e.g., for whatever 'appropriate' may mean for the UE 502 or its user, depending on usage, location, etc.). Such a Wi-Fi charging 'what-if' scenario may be unique compared to current solutions.

Consider a multiple identity charges rotation example use case 900, as shown in FIG. 9, that may continue from the examples of FIGS. 7 and 8 in which the UE 502 has chosen an identity that provides a 'best' or 'appropriate' charge model, as shown at 810. In one example, a free or cheap access may be considered an appropriate access, however, 'appropriate' could also be related to higher bandwidth or other comparable Service-Level Agreement (SLA) announced by the charging network in some instances. Accordingly, determination of an appropriate charge model/access to which a given UE selects to connect to a visited network may vary depending on use case.

In the embodiment of FIG. 9 an appropriate charge model may be data and/or time bound, with a limit in kilobytes (KB) of data and/or time. For example, at the end of the 30 minute timer for provider1, as shown at 902, the visited network 510 may announce a charge change and the UE 502 may react, as shown at 904, by switching its identity to the next appropriate identity; thus, starting (in this example) the next ranked/appropriate charge model, as shown at 906/908.

In various embodiments, one or more triggering events may cause a UE to switch identities through which to access a visited network. Various triggering events may include, but not be limited to, a time-based triggering event (e.g., time period reached, time of day, day of week, etc.), a data-usage-based triggering event (e.g., data limit reached, data usage for a given application, etc.), a location-based triggering event (e.g., usage at a given location, entering or exiting a given location, etc.), and/or an application-based triggering event (e.g., using a particular application/applications, data/time usage for an application, location usage for an application, etc.), combinations thereof, and/or the like. Such an identity rotation that may be utilized by a given UE in order to maintain an appropriate charge model for the UE may also be considered unique in this context.

Various backend exchanges are now analyzed through various additional examples discussed herein below. Consider FIG. 10 involving a local profile charge policy validation example use case 1000 involving UE 502 and visited network 510 in which UE 502 embarks, within or outside of its OpenRoaming profile, a chargeable network policy.

In the embodiment of FIG. 10, further consider that a first identity provider, which may be an employer in this instance, has provisioned (e.g., via an Information Technology (IT) system for provider1) a charge profile 'Profile2' for UE 502 that indicates the user-specific identity for the user associated with UE 502 for the first identity realm (e.g., 'UserA@provider1.com'), an employee category for the user (e.g., blue badge), and an acceptable charge policy (e.g., accept up to $5 per minute or $3 per kilobit (kb)).

In this embodiment, upon obtaining the chargeable network indication at 1002, UE 502 queries visited network 510 for the charging policy associated with the first identity realm, at 1004. At 1006, visited network 510 performs a local policy check (e.g., via AoC server 514/AoC logic 515) for the first identity realm and returns the charging policy metadata for the charge policy/model for the first identity realm (e.g., up to 30 GB or 30 minutes is free, then $2 every 10 minutes thereafter), as shown at 1008.

Upon receiving the charge information for the first identity realm from the Wi-Fi® network (513/512) at 1008, the UE 102 compares the announced charge to its acceptable charge policy (Profile2) for the matching realm, as shown at 1010, and automatically accepts the charge based on determining that it is within a given threshold for the charge policy provisioned for Profile1, as shown at 1012.

It is understood that the UE 102 may have multiple profiles, each with different policies, and that the UE (or the user) may sort the profiles based on their associated perceived cost (e.g., best performance first, best cost control first, etc.). For example, the user/UE 502 may have a charge profile ranked as 'Profile1' that is associated with a second identity realm (e.g., '@provider2') that 502 that indicates the user-specific identity for the user associated with UE 502 for the second identity realm (e.g., 'UserA@provider2.com'), a category for the user (e.g., platinum user), and an acceptable charge policy, which in this example indicates that the user/UE 502 has no specific provisions/limitations regarding the local charge by a visited network for the given identity; thus, the user/UE may accept any charges for visited network access. In this instance, since no charge limitations, data caps, etc. are associated with the charge profile for the second identity realm, the charge profile may be ranked higher (Profile1) than the charge profile for the first identity realm (Profile2). Such an embodiment involving the ability of a given user/UE to swap between profiles and select an identity that fits an appropriate charge profile for the user/UE may also be considered unique in this context.

Figure 11:
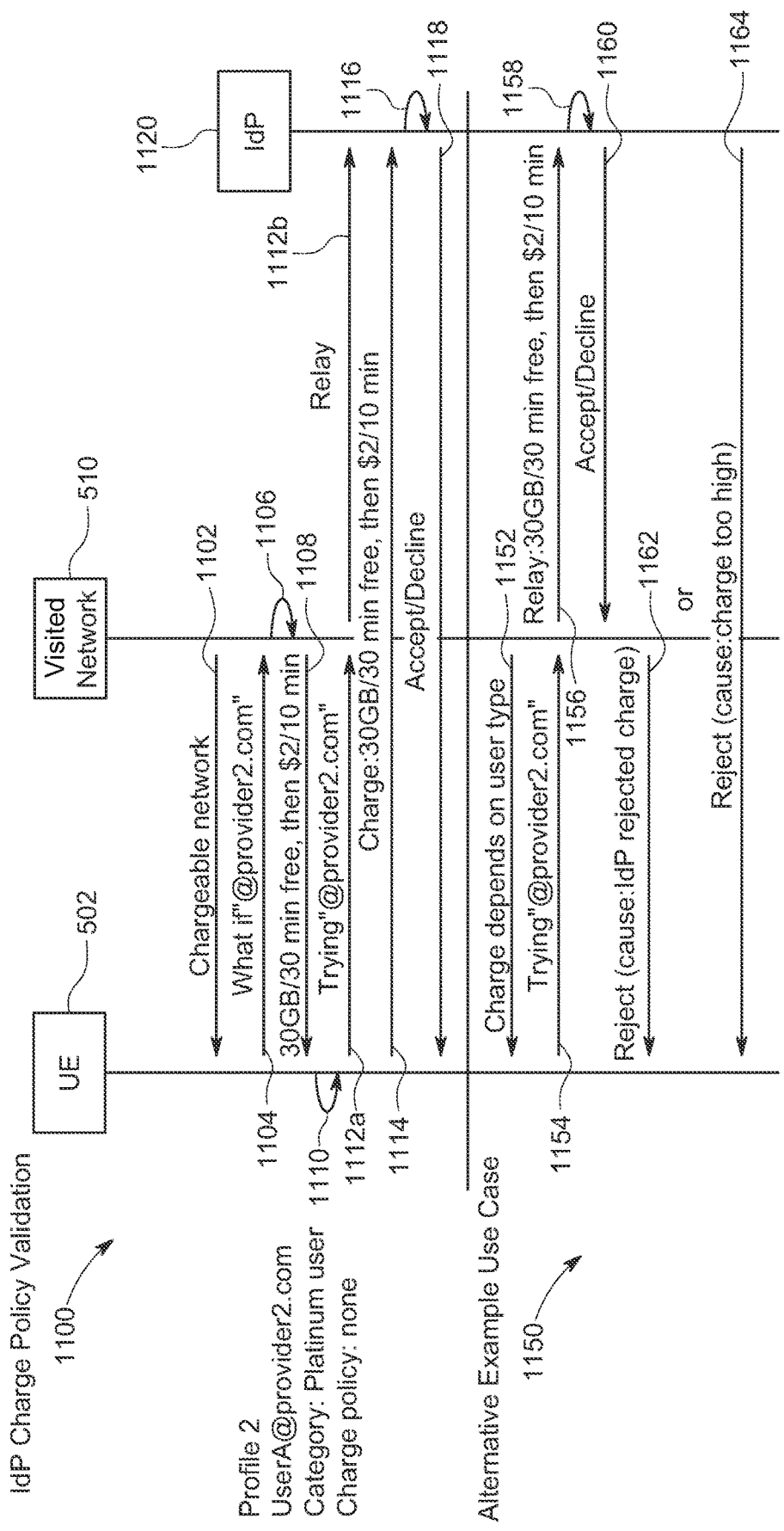

Consider further, as shown in FIG. 11, an IdP charge policy validation example use case 1100 involving UE 502, visited network 510, and an identity provider (IdP) 1120. In various embodiments, IdP 1120 may be home network 520 or a third-party IdP 530. For the embodiment of FIG. 11, consider that the UE 502 charge profile does not include a specific provision about the local charge for a given identity (e.g., charge policy: none).

In this embodiment, upon obtaining the chargeable network indication at 1102, UE 502 queries visited network 510 for the charging policy associated with an identity realm (e.g., '@provider2.com') at 1104. At 1106, visited network 510 performs a local policy check for the identity realm and returns the charging policy metadata for the charge policy/model for the identity realm (e.g., up to 30 GB or 30 minutes is free, then $2 every 10 minutes thereafter), as shown at 1108.

Upon receiving the charge information for the identity realm from the Wi-Fi® network (513/512) at 1108, the UE 502 compares the announced charge to its acceptable charge policy (Profile1) for the matching realm, as shown at 1110, and automatically accepts the charge based on determining that it is within a given threshold for the charge policy provisioned for Profile1, as shown at 1112*a*, via visited AAA 516.

In this embodiment, the UE 502 attempts to authenticate to using the candidate identity (e.g., '@provider2.com'), as shown at 1112*a*, in which the visited network 510 (via visited AAA 516 relays the authentication to the IdP 1120 at 1112*b*. Further, as shown at 1114, the UE 502 also informs the IdP 1120 of the charge by the UE 502 within the authentication phase, as shown at 1114. The IdP 1120 can then accept or reject the charge (e.g., based on a comparison with subscriber information for UE 502 and/or other policy information, as shown at 1116) and accept or decline the association, as shown at 1118. Although the query for the embodiment of FIG. 11 is discussed with reference to a Wi-Fi® connection at time of association, it is to be understood that the UE 502 could also query over a Control and User Plane Separation (CUPS), S14, or LTE control path, if the IdP 1120 is also managing a UE LTE link and/or via any other interface as may be applicable for a WWA link.

In an extension of this example use case, as shown at 1150, another embodiment may include, for example, because the charge may depend on a user category (e.g., user type, device type, etc.) for a given realm, that the access network 512 may or may not provide full charge information before association but rather, may signal as shown at 1152 (following a 'what-if' query for '@provider2.com'), an indication to UE 502 that charging depends on user type. In such an embodiment, regardless of the outcome of the UE 'what-if' query, the UE attempts the authentication, as shown at 1154.

At this phase, the IdP 1120 can perform an exchange with the local access network (for example providing the user category) in which the access network 512/radio node 513 can send the intended charge to the IdP 1120, as shown at 1156. The IdP 1120 can then accept or reject the charge, as shown at 1160 (e.g., based on a comparison with subscriber information for UE 502 and/or other policy information, as shown at 1158). In case of rejection, the access network can decline the UE association, as shown at 1162, or the IdP 1120 can decline the association, as shown at 1164, and provide reason cause indicating that the charge is declined. Such embodiments may be considered unique for chargeable Wi-Fi® networks.

Figure 12:
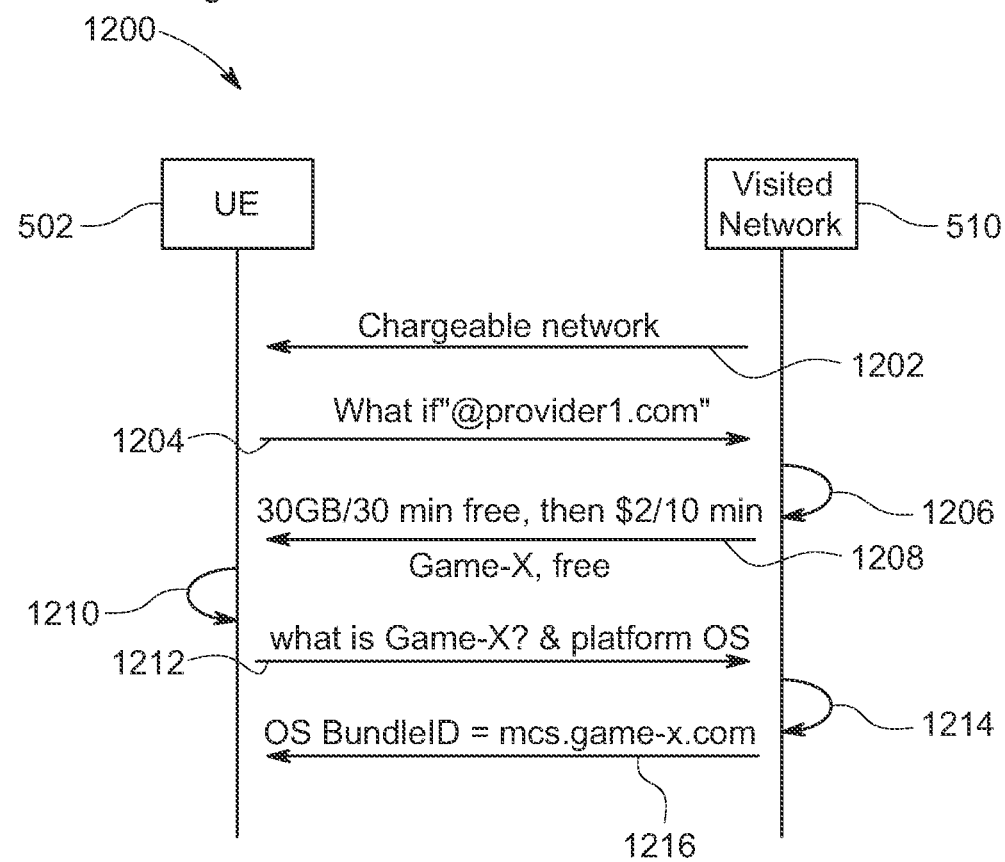

Consider further, as shown in FIG. 12, a pre-access charge check example use case 1200 involving UE 502 and visited network 510. The example use 1200 shown in FIG. 12 may be considered a variation of embodiments illustrated in FIGS. 7 and 8 in which an application-specific charge policy (e.g., for a particular game, etc., such as 'Game-X', as illustrated in FIG. 12) can be communicated to UE 502.

For example, upon obtaining a chargeable network indication at 1202, UE 502 queries visited network 510 for the charging policy associated with an identity realm (e.g., '@provider1.com'), at 1204. At 1206, visited network 510 performs a local policy check for the identity realm and returns the charging policy metadata for the charge policy/ model for the identity realm (e.g., up to 30 GB or 30 minutes is free, then $2 every 10 minutes thereafter, traffic for Game-X is free), as shown at 1208.

Upon receiving the charge information for the identity realm from the Wi-Fi® network (513/512) at 1208 several UE 502 reactions/operations may be possible at 1210, which are examined through several example embodiments including:

A. The UE 502 may simply record the application-specific policy and make an identity decision based on other, more general criteria (e.g., 30 GB/30 free).

B. The UE 502 may already be using the application, or usage information for the application may be recorded in the UE as highly used (e.g., Operating System (OS) specific cellular data usage, top N applications, battery usage, etc.) in which case the application-specific charge may be tie breaker or a key element for an identity decision by the UE 502.

C. Similar to the embodiment of FIG. 11, the UE 502, via visited network 510, may query an IdP, and the IdP may switch the UE to the local Wi-Fi® network (e.g., because the announced cost on Wi-Fi® is less than an LTE evaluated cost for that application and the user for example, a power user for that application). It is to be understood that this cost can be weighed against other advertised parameters, including SLA, and/or the like (e.g., as discussed above for embodiments discussed with reference to FIGS. 1-5).

D. The application may not be recognized by the UE 502 if a generic name is provided. In such an embodiment, techniques herein allow for the UE 502 to query for the application details, providing for example its platform information, such as OS type, version, etc., as shown at 1212. The access network may then fetch from a local or online database (e.g., via visited AoC server 514, charging profile database 525 for home network 520, and/or a third-party IdP 530) a bundle ID for that application and the requesting platform, as shown at 1214. The message may then be surfaced or sent to the user, as shown at 1216, through an application-specific message (e.g., "Game-X beeps," causes UE 502 to vibrate, etc.), through the OS (e.g., a popup, vibration, etc.), through a public display (e.g., digital signage in a venue), combinations thereof, and/or the like.

Some embodiments of FIG. 12 may apply to cases in which an IdP may be an SP. However, in some instances, operations may include an SP offloading traffic to a third party Wi-Fi network based on compared costs and SLA for a specific application. In still some instances, techniques may include an application receiving a specific treatment over a Wi-Fi network that may be announced to the UE and/or user.

Figure 13:
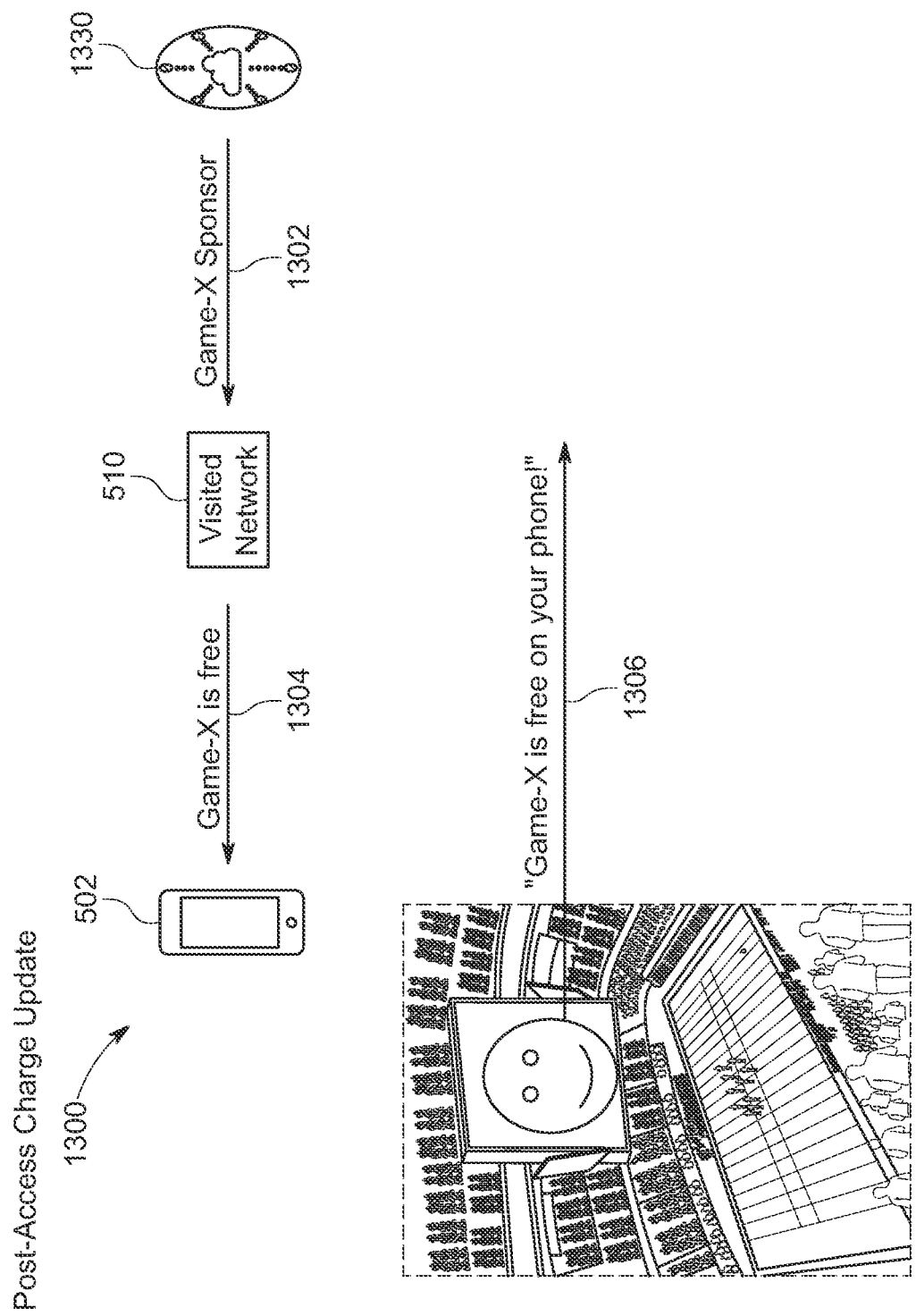

Consider further, as shown in FIG. 13, a post-access charge update example use case 1300 involving UE 502, visited network 510. The example use case 1300 shown in FIG. 13 may be considered yet a further variation of embodiments illustrated in FIGS. 7 and 8. In this example use case, charging rules for an application may be communicated to UE 502 during a given session with visited network 510.

In this example, a third-party enterprise or sponsor 1330, which may be considered an IdP (e.g., IdP 530) can communicate with the local access network (e.g., access network 512 for visited network 510) to sponsor commercials on a stadium screen and temporal internet connection cost share. At a given time, the sponsor 1330 triggers the cost share start, as shown at 1302, which triggers the visited network 510, via access network 512 to communicate a charge update (e.g., Game-X free for new hour) to associated UEs (e.g., UE 502), as shown at 1304. The same message can either be surfaced to the user through a message on the UE 502, through a public display, as shown at 1306, combinations thereof, and/or the like. Such a charge-change method can be also be considered unique within this context.

Figure 14:
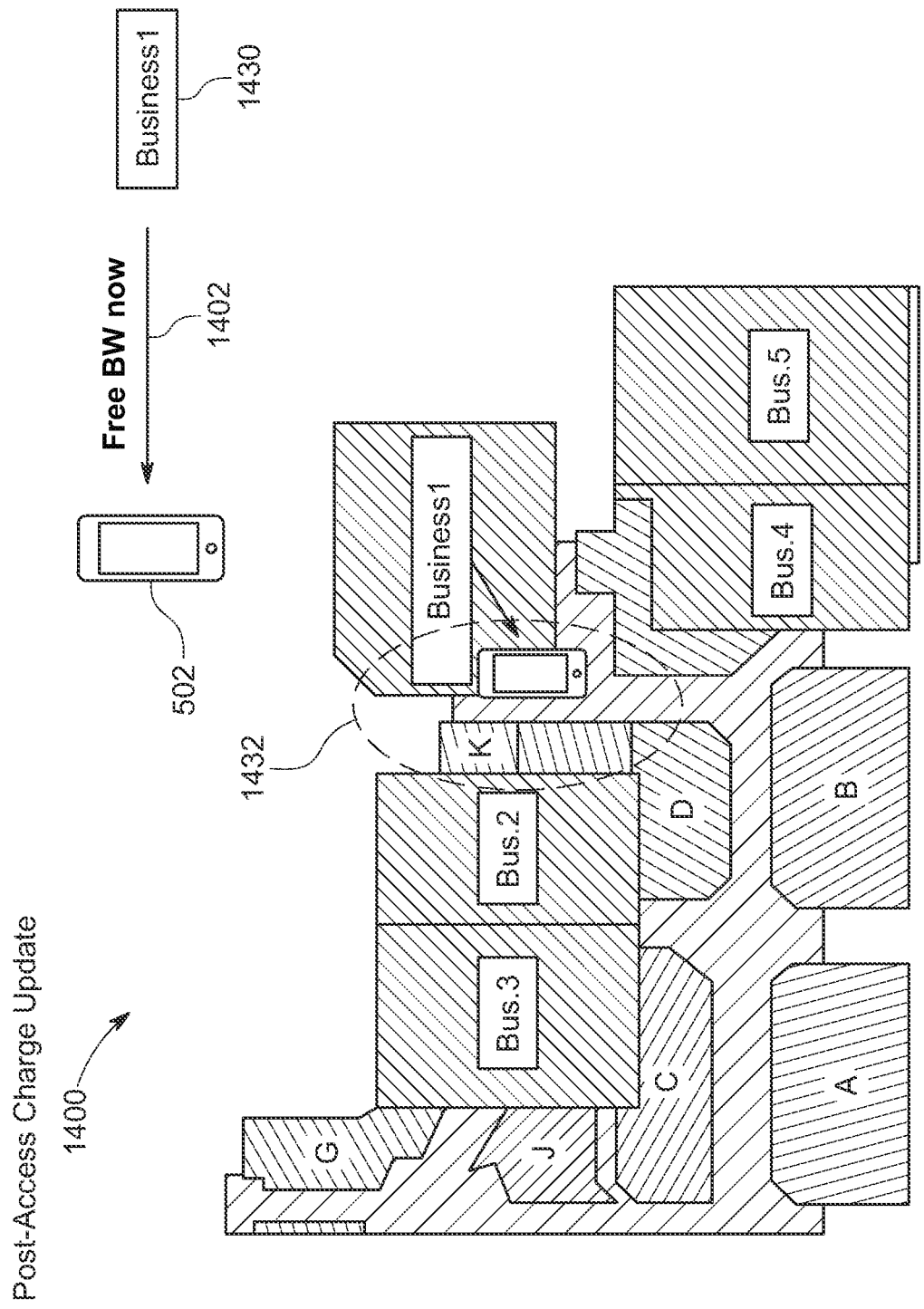

Consider further, as shown in FIG. 14, another post-access charge update example use case 1400 involving UE 502 and a business entity 1430. The example use case 1400 of FIG. 14 may be considered a further variation of the embodiment of FIG. 13 in which the charging rules for an application of/for an entire network may change based on the user environment. In this embodiment, consider that the UE 502 moves to an environment (e.g., a specific location 1432) of particular significance for a local network (e.g., an area having poor coverage, or, as illustrated in FIG. 14, a zone where competing networks may offer attractive connectivity charging conditions, attracting UEs and their associated analytics away from the local network). In these conditions, the local network may provide a charging rule update to the UE 502, as shown at 1402, which may have the intended effect of keeping the UE 502 on the local network (e.g., indicating free bandwidth (BW)) or discouraging the UE 502 from staying on the local network (e.g., peak user density at an event, causing announced charges increase, etc.).

Figure 15:
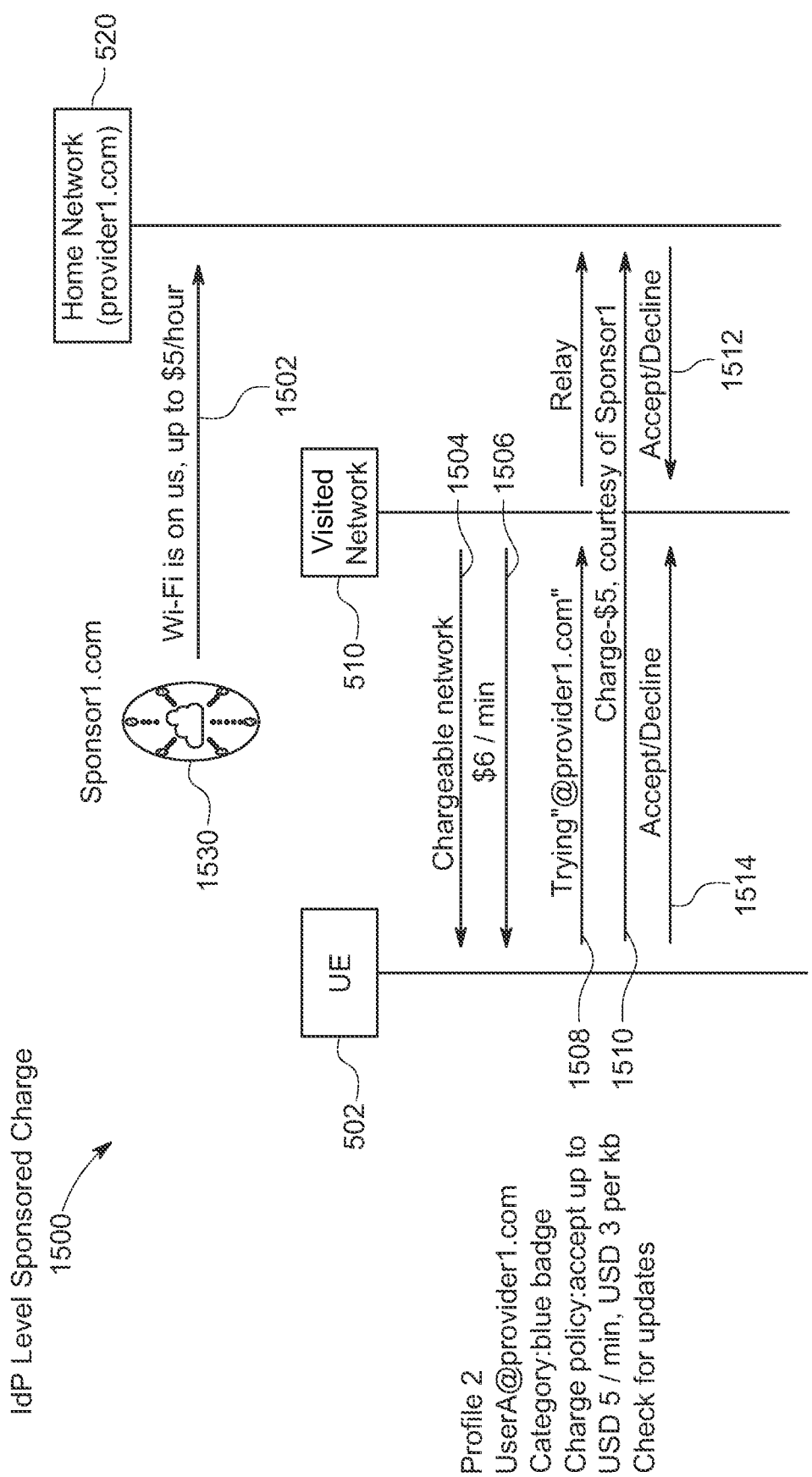

Consider further, as shown in FIG. 15, an IdP level sponsored charge example use case 1500 involving UE 502, visited network 510, home network 520, and a sponsor 1530, which may be considered a third-party IdP for this example. The example use case 1500 of FIG. 15 may be considered a further variation of the embodiment of FIG. 8 in which the sponsor 1530 (Sponsor1.com), as shown at 1502, may provide specific conditions to a specific IdP, such as home network 520 ('@provider1.com'C), such as, for example: Sponsor1, "Provider1, thank you for your business, we'll pay for your traveling employees Wi-Fi for the next 3 months, up to $5 per hour."

For this example, pre-association the UE 502 may have a specific charge profile (Profile2) that indicates the user-specific identity for the user associated with UE 502 for the identity realm (e.g., 'UserA@provider1.com'), an employee category for the user (e.g., blue badge), and an acceptable charge policy (e.g., accept up to $5 per minute or $3 per kilobit (kb)). The UE 502 may also be configured with a 'check for updates' policy or equivalent.

In this example, the UE 502 obtains a chargeable network indication at 1504 and, at 1506 (following a query for provider1.com, not shown) obtains charging policy metadata for the charge policy/model for the identity realm (e.g., $6 per minute).

Upon receiving the advice of charge from the network, which may be generic as per the embodiment of FIG. 7, the UE 502 may query the home network 520 (e.g., IdP), either during an attempt to associate, as shown at 1508, or through a test-attempt, as shown at 1510 (e.g., through an initiation of an EAP authentication with the intent of receiving conditional updates, not necessarily with the intent to complete the association transaction). The home network 520 may provide a temporal update of the UE charge policy, as shown at 1512, which may cause the UE 502 to modify its association decision, as shown at 1514 (or its comparison between profiles, etc. as discussed for various examples herein). Such sponsorship choreography for paid Wi-Fi® access can also be considered unique.

Figure 16:
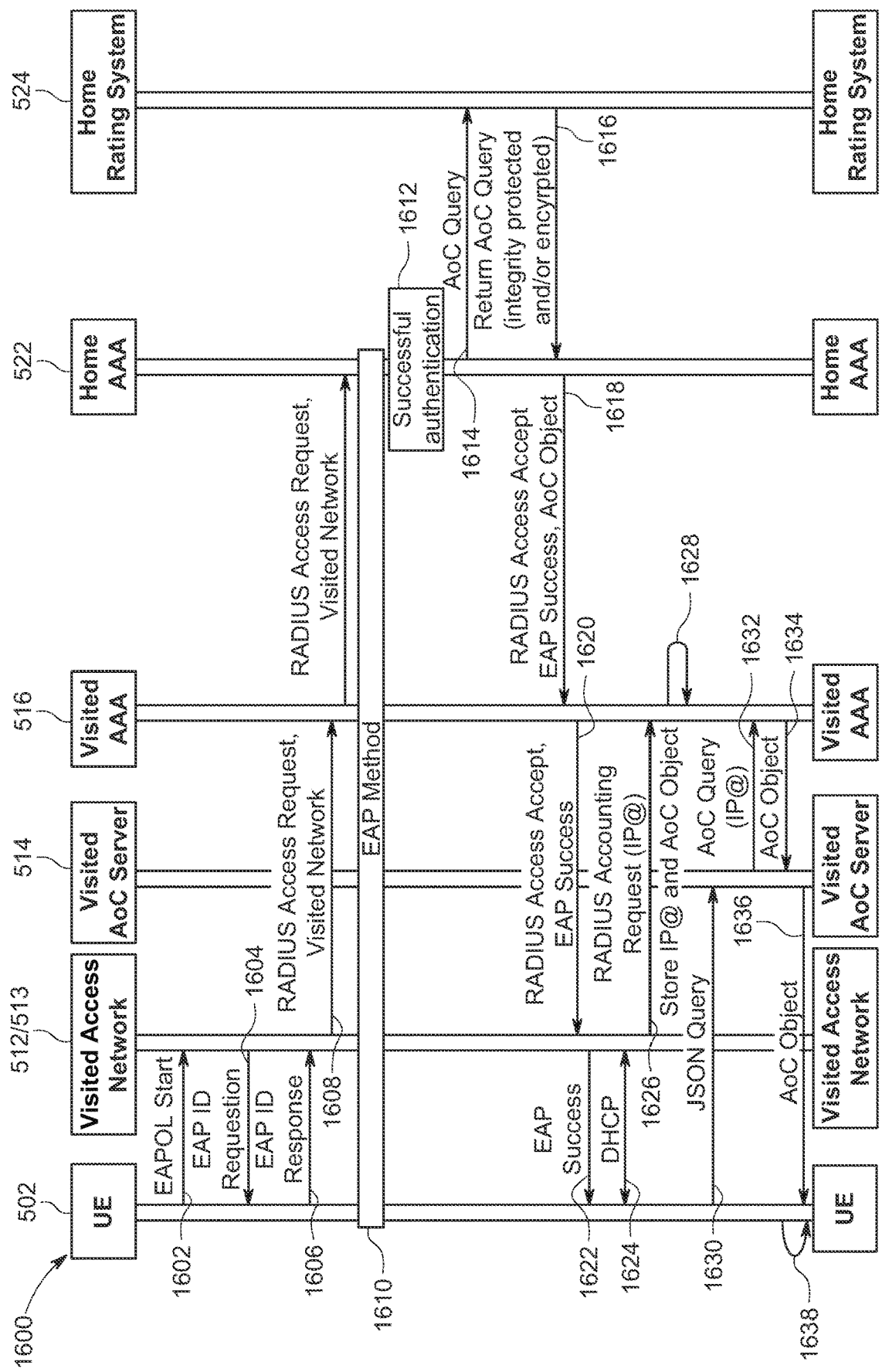
FIG. 16 is a message sequence diagram illustrating a call flow associated with securely delivering and utilizing AoC information, according to an example embodiment.

FIG. 16 is a message sequence diagram illustrating a call flow 1600 illustrating example operations that may be associated with securely delivering and utilizing AoC information for the system of FIG. 1, according to an example embodiment. FIG. 16 includes UE 502, visited access network 512/radio node 513, visited AoC server 514, visited AAA 516, home AAA 522, and home rating system 524.

Broadly, features and/or operations illustrated for the embodiment of FIG. 16 may include an EAP authentication between a roaming subscriber, such as UE 502, access network 512, visited AAA 516, and home AAA 522, as shown at 1602, 1604, 1606, 1608, and 1610, which results in a successful authentication for UE 502 with home AAA 522, as shown at 1612. At 1614, home AAA 522 performs an AoC query with home rating system 524/charging profile database 525 to recover a charging profile (e.g., an AoC object, as discussed herein) that includes charging policy metadata for the roaming subscriber, UE 502, as shown at 1616. In some embodiments, the AoC object can be integrity protected via signing using a home network 520 public key. Optionally, the AoC object can be encrypted with a home network public key (e.g., if the home network does not want to share AoC information with the visited network). The public key for the home network is known by UE 502 in order to verify the integrity of a signed AoC object and/or decrypt an encrypted AoC object.

The (signed/encrypted) AoC object can be signalled to the visited AAA 516 from home AAA 522, as shown at 1618, via a RADIUS access accept message indicating an EAP success for the UE 502 EAP authentication. The EAP success can be signalled to the UE 502, as shown at 1620 and 1622. At 1624, a Dynamic Host Configuration Protocol (DHCP) process is performed between UE 502 and visited access network 512 in order to provide an IP address (IP@) for UE 502 for the UE's session with the visited network.

By coupling the DHCP process together with a RADIUS accounting request for the UE 502, as shown at 1626 and 1628, the visited AAA 516 can associate/store the AoC object obtained at 1618 with the session for the UE 502 using the UE's IP address (IP@).

Thereafter, upon obtaining a JSON query from the UE 502 for a charging policy, as shown at 1630, the visited AoC server 514, via AoC logic 515, is able to recover the IP@ of the querying client and either consult its own database of AoC to IP@ mapping information and/or query the visited AAA for such information (e.g., as shown at 1632 and 1634) in order to return the correct (signed/encrypted) AoC object (charging policy metadata) to the querying UE, as shown at 1636. At 1638, the UE 502 can verify the integrity of the AoC object or decrypt the AoC object using the public key for home network 520 known to the UE. Additional operations for selecting an identity through which to connect to the network can be performed by the UE, as discussed for various embodiments herein.

Figure 17:
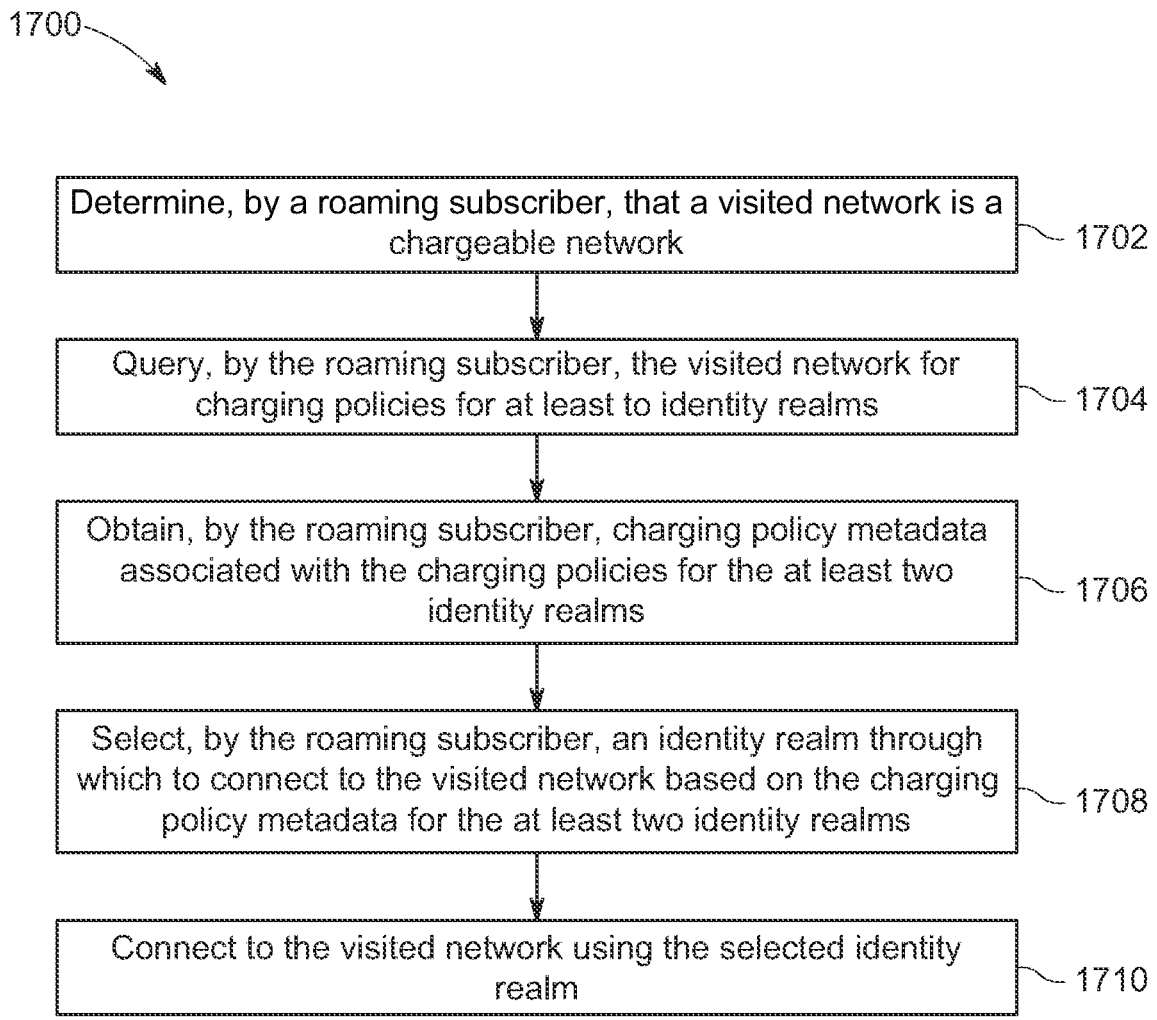
FIG. 17 is a flow chart depicting a method according to an example embodiment.

FIG. 17 is a flow chart depicting another method 1700 according to an example embodiment. In at least one embodiment, method 1700 may be performed by a roaming subscriber, such as UE 502.

At 1702, the method may include determining, by the roaming subscriber, that a visited network is a chargeable network. At 1704, the method may include querying, by the roaming subscriber, the visited network for charging policies for at least two identity realms. At 1706, the method may include obtaining, by the roaming subscriber, charging policy metadata associated with the charging policies for the at least two identity realms.

At 1708, the method may include selecting, by the roaming subscriber, an identity realm through which to connect to the visited network based on the charging policy metadata for the at least two identity realms. For example, the selecting may be based on comparisons between the charging policy metadata obtained for each identity realm and local charging profiles provisioned for the roaming subscriber to determine an optimal identity through which to connect to the visited network, and selecting an identity realm based on the comparisons. At 1710, the method may include the roaming subscriber connecting to the visited network using the selected identity realm.

Thus, techniques presented herein may be utilized to facilitate delivering and utilizing AoC information through a JSON schema and API that enables devices to recover AoC information in an access technology neutral manner. Based on such recovered AoC information, a device may determine one or network identities to utilize for connecting to one or more access network(s).

Techniques presented herein may provide various advantages and/or distinctions in comparison current implementations involving ANQP and HotSpot® 2.0 (HS 2.0). Various distinctions in scope and modes of action may be highlighted for techniques herein as compared to ANQP and HS 2.0 implementations. For example, certain advice of charge elements are defined in IEEE 802.11-2016 9.4.5.21 for implementation within HotSpot 2.0 R3. In the HS 2.0 scheme, an "Advice of Charge" is announced by the network (via beacons). A client can then query the network (only before association) with an ANQP query in the form of "what is the network access cost?" The network can then reply with an Advice of Charge ANQP element that specifies tuples in the form {Service Provider, charging mode (per hour, kB etc.), currency, amount}. The intent in HS 2.0 is to provide a simple mechanism to assess the network cost before joining the network. But the only flexibility is to allow different Network Access Identifier (NAI) realms (Service providers) to charge differently (different cost per unit, different unit types, etc.).

In the context of a federation and an expanded relationship between access networks, identity providers and sponsors [it should be noted that 'sponsors' and associated concepts do not exist in HS 2.0], the HS 2.0 scheme can be considered overly simplistic.

In contrast to current deployments, techniques provided herein facilitate:

1. A scheme where a user/UE can express an identity before receiving an advice of charge [in HS 2.0, the ANQP charge query is generic, the UE/station (STA) AoC query does not express anything other than a question, and the network responds with a generic list of prices; it looks like a generic product list and HS 2.0 very much exposes the price of all competitors/IdPs in an unencrypted frame]. In the scheme provided by techniques herein, a user/UE can start the EAP process (protect the communication), then express an identity and ask for the associated price. Upon the answer from the network, the user can express another identity (if another identity is configured, based on the answer, etc.) and potentially determine a different price. For example "UserA@provider2.com"→"X USD per minutes" and "UserA@provider1.com"→Y USD GB, first 10 GB free" may result in a decision by the UE to use UserA@provider1.com as the connecting identity. Such techniques as provided herein expand considerably on the static and generic HS 2.0 scheme because it allows dynamic negotiation between both sides, protection of the negotiation, and choice of an identity by a UE that best or most appropriately matches the user-preferred conditions. Additionally, current solutions openly expose charging information. However, by allowing the information to be exchanged during or after the authentication phase, embodiments herein limit the perimeter of this issue.

2. A scheme where a charge may depend on the application. In HS 2.0, the charge is statically mapped to an SP for 'access'. In a more complex world involving OpenRoaming, a scheme may be desirable in which sponsors can propose a particular treatment for specific applications. For example, an SP can evaluate that their contractual exchange with a local access provider is not conducive to voice application quality (e.g., because the local access network is too poor, because the local access provider will charge back access to the IdP, etc.). In this scenario, techniques herein provide for the ability for the network to respond, for example, with "UserA@provider2.com"→X USD per minute, but voice dialer has extra charge of Y USD per minute". Similarly, sponsors can run flash operations. For example, in a stadium on a game night, a cost could appear as "UserA@provider2.com" →X USD per GB, but television network streaming is free"; or "during commercials on the latest Game-X game)→Game-X is free for next 30 minutes"; etc. For such instances, techniques provided herein greatly expand the scope of identity selection compared to HS 2.0, which does not have any notion of flexibility in cost based on an application.

3. A scheme where the cost can change over time, based on different criteria, such as STA location, competing STAs, and/or other any criteria/combinations thereof that can be left to an access provider (e.g., pressure on the local radio node) and/or IdP to determine. For example, in accordance with embodiments herein, as the pressure on a local stadium Wi-Fi® increases (as more users walk in and start using the network), the charge scheme can dynamically change. For example, "UserA@provider2.com"→free to begin, then 30 minutes later→advice of charge update, cost is now X USD per 10 GB unit" etc. In another example, "advice of charge update, price remains 'free', but BW is capped to 500 Kbps" and "UserA@provider1.com"?→"no BW limitation, but X USD per minute"→switch to UserA@provider1.com identity". In yet another example, consider that a user moves to a seat at the edge of a cell coverage, where Wi-Fi signal is limited "charge decreases from X USD per minute to Y cent per minute." Here again, techniques herein provide for a scope that is greatly expanded in comparison to the scope of HS 2.0, by defining a larger scheme where cost can be dynamically exchanged and adjusted based on user identity (possibly multiple identities), user location, conditions of the cell, possible technical and/or business constraints and agreements between IdPs and a local access provider, combinations thereof, and/or the like.

Figure 18:
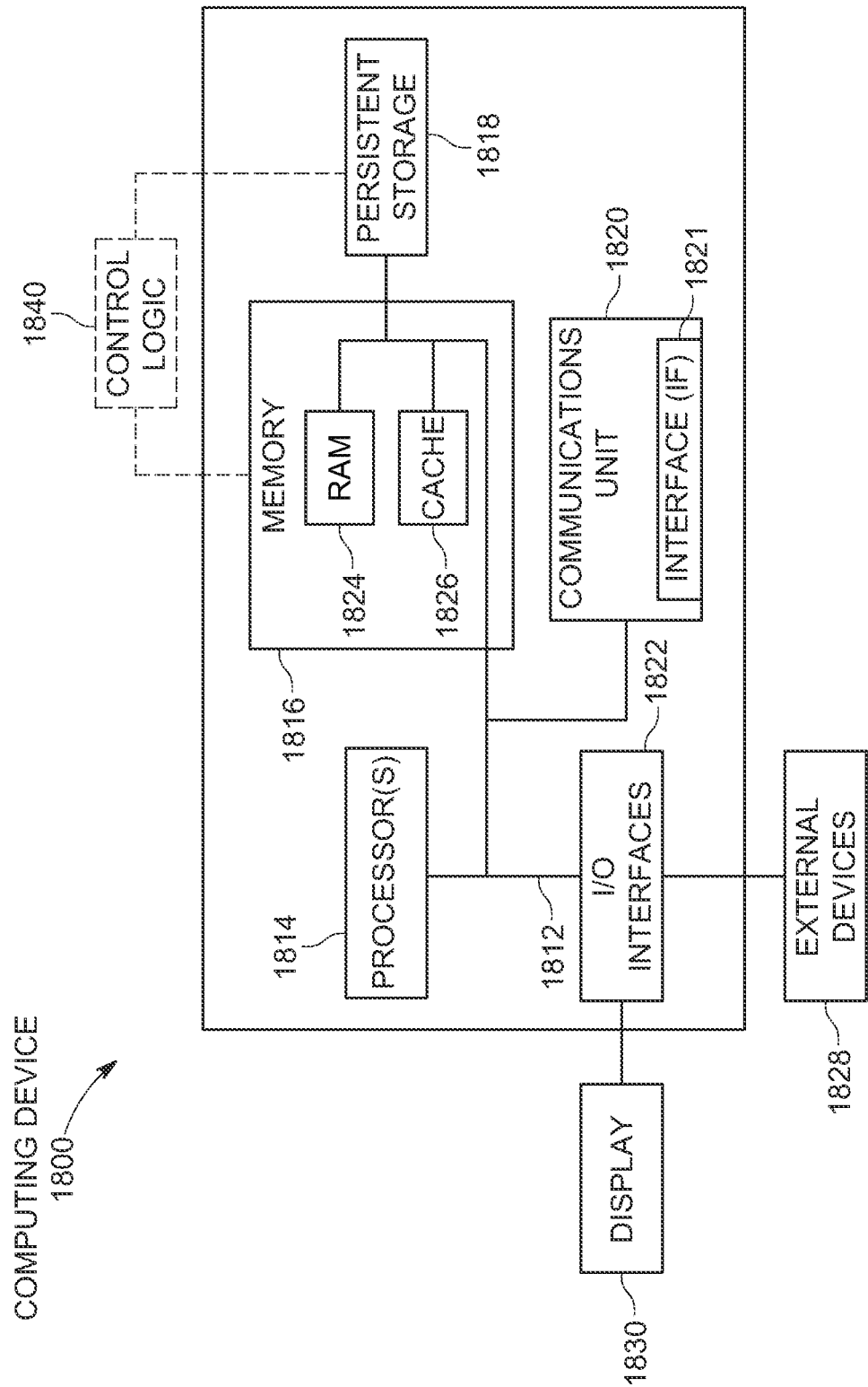
FIG. 18 is a hardware block diagram of a computing device that may perform functions associated with any combination of operations, in connection with the techniques discussed herein.

Referring to FIG. 18, FIG. 18 illustrates a hardware block diagram of a computing device 1800 that may perform functions associated with operations discussed herein in connection with the techniques depicted in FIGS. 1-17. In various embodiments, a computing device, such as computing device 1800 or any combination of computing devices 1800, may be configured as any elements/devices/nodes as discussed for the techniques depicted in connection with FIGS. 1-17. In various embodiments, computing device 1800 may be implemented as any network element of a visited network (e.g., visited network 110/510), a home network (e.g., home network 120/520), an IdP (e.g. IdPs 530, etc.), and/or a roaming subscriber (e.g., UE 102/502) as discussed for various techniques herein.

It should be appreciated that FIG. 18 provides only an illustration of one embodiment and does not imply any limitations with regard to the environments in which different embodiments may be implemented. Many modifications to the depicted environment may be made.

As depicted, the computing device 1800 includes a bus 1812, which provides communications between computer processor(s) 1814, memory 1816, persistent storage 1818, at least one communications unit 1820, and input/output (I/O) interface(s) 1822. Bus 1812 can be implemented with any architecture designed for passing data and/or control information between processors (such as microprocessors, communications and network processors, etc.), system memory, peripheral devices, and any other hardware components within a system. For example, bus 1812 can be implemented with one or more buses.

Memory 1816 and persistent storage 1818 are computer readable storage media, which can be inclusive on non-transitory computer readable storage media. In the depicted embodiment, memory 1816, which may be inclusive of one or more memory element(s), includes random access memory (RAM) 1824 and cache memory 1826. In general, memory 1816 can include any suitable volatile or non-volatile computer readable storage media.

Instructions for control logic 1840 may be stored in memory 1816 and/or persistent storage 1818 for execution by processor(s) 1814. Control logic 1840 may be implemented as any logic and/or combinations thereof, as discussed for various embodiments herein.

In various embodiments, control logic 1840 can include instructions that, when executed, cause processor(s) 1814 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein (e.g., for operations discussed with reference to FIGS. 1-17).

For example, if computing device 1800 is implemented as an identity authentication/authorization system (e.g., identity authentication/authorization system 122 of FIG. 1), control logic 1840 may be configured as access logic (e.g., access logic 123) such that when the processor(s) 1814 execute control logic 1840, the processor(s) 1814 are caused to perform operations including obtaining a request to authorize access of a roaming subscriber for a visited network; determining whether the request includes visited network charging information and visited network metric information; based on determining that the request includes the visited network charging information and the visited network metric information, determining whether one or more visited network metrics satisfy one or more threshold metrics for the roaming subscriber; and based on determining that the one or more visited network metrics satisfy the one or more threshold metrics for the roaming subscriber, authorizing access of the roaming subscriber for the visited network.

In another example, if computing device 1800 is implemented as a UE to perform AoC techniques discussed herein (e.g., UE 502), control logic 1840 may be configured such that when the processor(s) 1814 execute control logic 1840, the processor(s) 1814 are caused to perform operations including determining that a visited network is a chargeable network; querying the visited network for charging policies for one or more identity realms; obtaining charging policy metadata associated with the charging policies for the one or more identity realms; selecting an identity realm through which to connect to the visited network based on the charging policy metadata for the at least two identity realms; and connecting to the visited network using the selected identity realm. It is to be understood that if computing device 1800 is implemented as a UE to perform AoC techniques discussed herein (e.g., UE 502), any number communications units 1820/interfaces 1821 may be configured for computing device to include any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate over the air RF connections with one or more access networks.

One or more programs and/or other logic (e.g., control logic 1840) may be stored in persistent storage 1818 for execution by one or more of the respective computer processors 1814 via one or more memory element(s) of memory 1816. The persistent storage 1818 may be a magnetic hard disk drive, a solid-state hard drive, a semiconductor storage device, read-only memory (ROM), erasable programmable read-only memory (EPROM), flash memory), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory 1816 and/or persistent storage 1818 can store data, software, code, instructions (e.g., processor instructions), logic, parameters, combinations thereof, and/or the like used for operations described herein. This includes memory 1816 and/or persistent storage 1818 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Communications unit 1820, in these examples, provides for communications with other data processing systems, networks, and/or devices. In these examples, each communications unit 1820 may include at least one interface (IF) 1821, which may facilitate communications with systems, networks, and/or devices utilizing any combination of hardware, software, etc. to facilitate one or more connections for communications discussed herein. Accordingly, communications unit 1820 may provide communications through the use of any combination of physical and/or wireless communications links.

I/O interface(s) 1822 may allow for input and output of data with other devices that may be connected to computing device 1800. For example, I/O interface 1822 may provide a connection to external devices 1828 such as a keyboard, keypad, a touch screen, and/or some other suitable input device. External devices 1828 can also include portable computer readable storage media such as database systems, thumb drives, portable optical or magnetic disks, and memory cards.

Software and data used to practice embodiments can be stored on such portable computer readable storage media and can be loaded onto persistent storage 1818 via I/O interface(s) 1822. I/O interface(s) 1822 may also connect to a display 1830. Display 1830 provides a mechanism to display data to a user and may be, for example, a computer monitor.

In one form, a computer-implemented method is provided herein that may include obtaining, by a roaming participant, charging policy metadata via an in-line mechanism. In one instance, the participant may be a home network and the charging policy metadata is appended to AAA signaling. In some instances, the home network uses the charging policy metadata when making a decision whether to authorize access by a roaming subscriber. In some instances, the home network uses service level assurance information when making a decision whether to authorize access by a roaming subscriber. In one instance, the participant may be a visited network and the charging policy metadata is appended to AAA signaling. The visited network may be operable to deliver the recovered policy metadata to a roaming subscriber. In some instances, the home network may encrypt the charging policy metadata with a key known to the roaming subscriber. In one instance, the participant is a roaming subscriber that communicates a query associated with a particular identity provider and the charging policy metadata is appended to ANQP signaling.

In one form a computer implemented method is provided that may include obtaining, by a home network, a request to authorize access of a roaming subscriber for a visited network; determining whether the request includes visited network charging information and visited network metric information; based on determining that the request includes the visited network charging information and the visited network metric information, determining whether one or more visited network metrics satisfy one or more threshold metrics for the roaming subscriber; and based on determining that the one or more visited network metrics satisfy the one or more threshold metrics for the roaming subscriber, authorizing access of the roaming subscriber for the visited network.

In some instances, the method may further include determining whether the visited network charging information satisfies one or more charging thresholds for the roaming subscriber prior to authorizing access of the roaming subscriber for the visited network. In some instances, the request is obtained via Authentication, Authorization, and Accounting (AAA) signaling that includes at least one of the visited network charging information and the visited network metric information. In some instances, the visited network charging information is included in a Remote Authentication Dial-In User Service (RADIUS) Vendor Specific Attribute (VSA).

In some instances, the visited network charging information includes at least one of: one or more data usage thresholds, one or more data usage rates associated with the one or more data usage thresholds, and a currency code. In some instances, the visited network metric information is included in one or more Remote Authentication Dial-In User Service (RADIUS) Vendor Specific Attributes (VSAs). In some instances, the visited network metric information includes at least one of: Radio Frequency (RF) assurance information including at least one of a percentage of connections for one or more Modulation and Coding Scheme (MCS), a channel utilization indication, and a Received Signal Strength Indicator (RSSI) for the roaming subscriber; and Internet Protocol (IP) assurance information including at least one of latency information, jitter information, packet loss information, and round trip time information. In some instances, at least one of the RF assurance information and the IP assurance information represent information averaged over a predetermined time window.

In some instances, the method further includes, based on the request including visited network charging information, updating the one or more threshold metrics for the roaming subscriber. In some instances, the method further includes prior to determining whether the one or more visited network metrics satisfy the one or more threshold metrics for the roaming subscriber, determining whether the one or more visited network metrics satisfy one or more threshold metrics associated with a plurality of subscribers of the home network. In some instances, the method further includes, following the authorizing, obtaining one or more updated visited network metrics; determining whether the one or more updated visited network metrics satisfy one or more continued service threshold metrics for the roaming subscriber; and disconnecting the roaming subscriber based on determining that the one or more updated visited network metrics fail to satisfy the one or more continued service threshold metrics for the roaming subscriber.

In one form, a computer-implemented method is provided that may include determining, by a roaming subscriber, that a visited network is a chargeable network; querying, by the roaming subscriber, the visited network for charging policies for at least two identity realms; obtaining, by the roaming subscriber, charging policy metadata associated with the charging policies for the at least two identity realms; selecting, by the roaming subscriber, an identity realm through which to connect to the visited network based on the charging policy metadata for the at least two identity realms; and connecting to the visited network using the selected identity realm.

In some instances, the method further includes obtaining, by the roaming subscriber, an indication from the visited network that identifies whether the visited network is a chargeable network or a non-chargeable network. In some instances, the querying is performed before performing a Wi-Fi association with the visited network. In some instances, the querying and the obtaining comprises: performing a first query for a first identity realm and obtaining first charging policy metadata associated with the first identity realm; and performing a second query for a second identity realm and obtaining second charging policy metadata associated with the second identity realm. In some instances, the charging policy metadata associated with at least one identity realm includes application-specific charging information.

In some instances, the selecting is based additionally on one or more charging profiles associated with one or more identity realms that are provisioned on the roaming subscriber. In some instances, at least one identity realm is a home network with which the roaming subscriber has a subscription, and the charging policy metadata is obtained from the home network. In some instances, the charging policy metadata is obtained following the home network determining subscription information for the roaming subscriber.

In some instances, the selecting includes selecting a first identity realm through which to connect to the visited network; determining a triggering event; and selecting a second identity realm through which to connect to the visited network. The triggering event may include at least one of: a time-based triggering event; a data-usage-based triggering event; a location-based triggering event; and an application-based triggering event.

In some instances, the charging policy metadata is included in Access Network Query Protocol (ANQP) signaling. In some instances, the charging policy metadata for at least one identity realm is encrypted with a key known to the roaming subscriber. In some instances, the key is provided by the at least one identity realm. In various instances, the charging policy metadata includes one or more of: one or more data usage thresholds; one or more usage costs associated with the one or more data usage thresholds; time-based information associated with at least one application; and location-based information associated with at least one application.

The programs described herein (e.g., control logic 1840) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, by a visited network, a request to authorize a roaming subscriber to connect to the visited network;
    based on obtaining the request, recovering visited network metric information and visited network charging information from an assurance system of the visited network;
    appending the visited network metric information and the visited network charging information to the request; and
    sending the request to a home network to determine whether the roaming subscriber is authorized to connect to the visited network.

2. The method of claim 1, wherein the appending is performed by an Authentication, Authorization, and Accounting (AAA) proxy element of the visited network.

3. The method of claim 1, wherein the appending is performed by a radio node of a visited access network for the visited network.

4. The method of claim 1, wherein the visited network charging information is appended to the request via a Remote Authentication Dial-In User Service (RADIUS) Vendor Specific Attribute (VSA).

5. The method of claim 1, wherein the visited network charging information includes at least one of: one or more data usage thresholds, one or more data usage rates associated with the one or more data usage thresholds, and a currency code.

6. The method of claim 1, wherein the visited network metric information is appended to the request via one or more Remote Authentication Dial-In User Service (RADIUS) Vendor Specific Attributes (VSAs).

7. The method of claim 1, wherein the visited network metric information includes at least one of:
    Radio Frequency (RF) assurance information including at least one of a percentage of connections for one or more Modulation and Coding Scheme (MCS), a channel utilization indication, and a Received Signal Strength Indicator (RSSI) for the roaming subscriber; and
    Internet Protocol (IP) assurance information including at least one of latency information, jitter information, packet loss information, and round trip time information.

8. The method of claim 7, wherein at least one of the RF assurance information and the IP assurance information represent information averaged over a predetermined time window.

9. The method of claim 1, further comprising:
    appending updated visited network metric information to an accounting request; and
    sending the accounting request to the home network to store the updated visited network metric information in an assurance system of the home network.

10. The method of claim 1, wherein to determine whether the roaming subscriber is authorized to connect to the visited network, the home network is to determine that the visited network metric information satisfies one or more threshold metrics for the roaming subscriber and the home network is to determine that the visited network charging information satisfies one or more charging thresholds for the roaming subscriber in order to authorize the roaming subscriber to connect to the visited network.

11. One or more non-transitory computer readable storage media encoded with instructions that, when executed by a processor, cause the processor to perform operations, comprising:
    obtaining, by a visited network, a request to authorize a roaming subscriber to connect to the visited network;
    based on obtaining the request, recovering visited network metric information and visited network charging information from an assurance system of the visited network;
    appending the visited network metric information and the visited network charging information to the request; and
    sending the request to a home network to determine whether the roaming subscriber is authorized to connect to the visited network.

12. The media of claim 11, wherein the visited network charging information is appended to the request via a Remote Authentication Dial-In User Service (RADIUS) Vendor Specific Attribute (VSA).

13. The media of claim 11, wherein the visited network metric information is appended to the request via one or more Remote Authentication Dial-In User Service (RADIUS) Vendor Specific Attributes (VSAs).

14. The media of claim 11, further comprising instructions that, when executed by a processor, cause the processor to perform operations, comprising:
    appending updated visited network metric information to an accounting request; and sending the accounting request to the home network to store the updated visited network metric information in an assurance system of the home network.

15. The media of claim 11, wherein the visited network metric information includes at least one of:
   Radio Frequency (RF) assurance information including at least one of a percentage of connections for one or more Modulation and Coding Scheme (MCS), a channel utilization indication, and a Received Signal Strength Indicator (RSSI) for the roaming subscriber; and
   Internet Protocol (IP) assurance information including at least one of latency information, jitter information, packet loss information, and round trip time information.

16. A system comprising:
   at least one memory element for storing data; and
   at least one processor for executing instructions associated with the data, wherein executing the instructions causes the system to perform operations, comprising:
      obtaining, by a visited network, a request to authorize a roaming subscriber to connect to the visited network;
      based on obtaining the request, recovering visited network metric information and visited network charging information from an assurance system of the visited network;
      appending the visited network metric information and the visited network charging information to the request; and
      sending the request to a home network to determine whether the roaming subscriber is authorized to connect to the visited network.

17. The system of claim 16, wherein the appending is performed by an Authentication, Authorization, and Accounting (AAA) proxy element of the visited network.

18. The system of claim 16, wherein the appending is performed by a radio node of a visited access network for the visited network.

19. The system of claim 16, wherein executing the instructions causes the system to perform operations, comprising:
   appending updated visited network metric information to an accounting request; and
   sending the accounting request to the home network to store the updated visited network metric information in an assurance system of the home network.

20. The system of claim 16, wherein the visited network metric information includes at least one of:
   Radio Frequency (RF) assurance information including at least one of a percentage of connections for one or more Modulation and Coding Scheme (MCS), a channel utilization indication, and a Received Signal Strength Indicator (RSSI) for the roaming subscriber; and
   Internet Protocol (IP) assurance information including at least one of latency information, jitter information, packet loss information, and round trip time information.

* * * * *